US011872951B1

(12) United States Patent
Damasio Simoes De Oliveira

(10) Patent No.: US 11,872,951 B1
(45) Date of Patent: Jan. 16, 2024

(54) VEHICLE OCCUPANT PROTECTION SYSTEM COMPRISING AIRTIGHT DEFORMABLE CONTAINER WITH PRESSURE SENSOR FOR GENERATING VEHICLE COLLISION SIGNAL

(71) Applicant: Zoox, Inc., Foster City, CA (US)

(72) Inventor: Joao Pedro Damasio Simoes De Oliveira, Leamington Spa (GB)

(73) Assignee: Zoox, Inc., Foster City, CA (US)

( * ) Notice: Subject to any disclaimer, the term of this patent is extended or adjusted under 35 U.S.C. 154(b) by 0 days.

(21) Appl. No.: 18/078,646

(22) Filed: Dec. 9, 2022

(51) Int. Cl.
*B60R 21/231* (2011.01)

(52) U.S. Cl.
CPC .......... *B60R 21/23138* (2013.01); *B60R 2021/23107* (2013.01); *B60R 2021/23146* (2013.01)

(58) Field of Classification Search
CPC .... B60R 21/23138; B60R 2021/23107; B60R 2021/23146
See application file for complete search history.

(56) References Cited

U.S. PATENT DOCUMENTS 8,374,751 B2 * 2/2013 Katz ................. B60R 21/0136
180/274

FOREIGN PATENT DOCUMENTS

| CN | 113654708 A | * | 11/2021 | .......... H01M 10/425 |
| JP | 2013141887 A | * | 7/2013 | |

OTHER PUBLICATIONS

Cheringal et al., U.S. Appl. No. 17/531,563, filed Nov. 19, 2021, "Vehicles and Vehicle Panels With Pressure Based Sensing for Detecting Objects Interfering With Closing of Panels".

* cited by examiner

Primary Examiner — Faye M Fleming
(74) Attorney, Agent, or Firm — EIP US LLP

(57) ABSTRACT

An occupant protection system may comprise an airtight, deformable container having a pressure sensor configured to generate a vehicle collision signal. A side airbag may be configured to expand between a stowed state and a deployed state. A deployment control system may be configured to receive the vehicle collision signal from the pressure sensor, and based upon the vehicle collision signal, cause an inflator to provide a gas to the airbag to thereby cause the side airbag to expand from the stowed state to the deployed state.

20 Claims, 10 Drawing Sheets

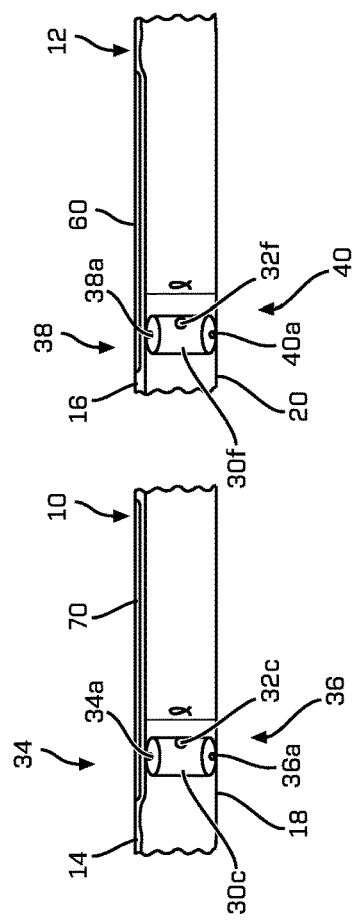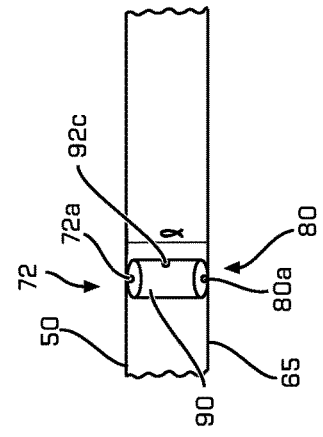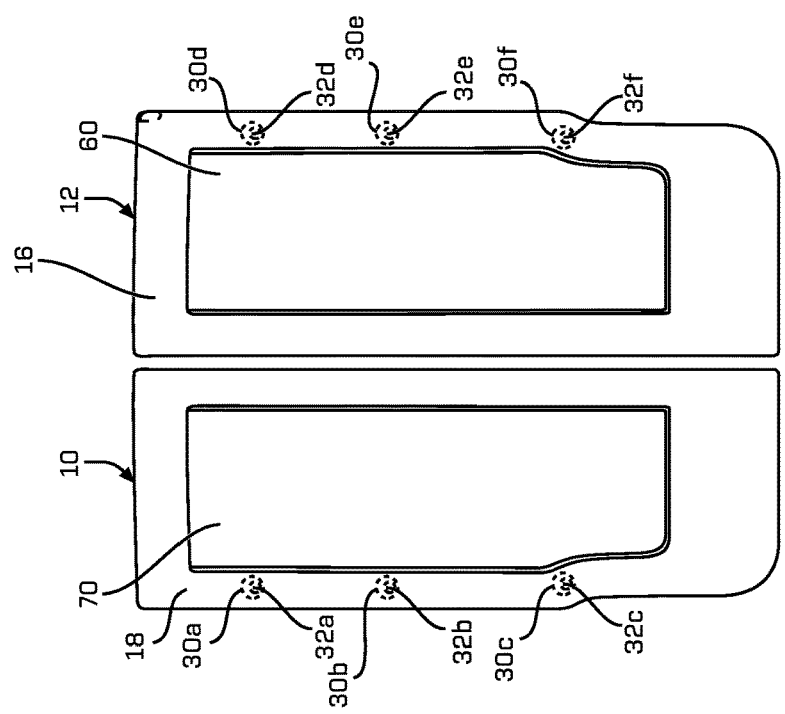

VEHICLE OCCUPANT PROTECTION SYSTEM COMPRISING AIRTIGHT DEFORMABLE CONTAINER WITH PRESSURE SENSOR FOR GENERATING VEHICLE COLLISION SIGNAL

BACKGROUND

Vehicle occupant protection systems, e.g., airbag systems and/or seatbelt systems, protect occupants of a vehicle from injury during a collision involving the vehicle. Vehicle occupant protection systems may comprise an airbag system having an airbag and an inflator for providing the airbag with a gas to inflate the airbag. Upon involvement in a collision, airbags may rapidly inflate to create a cushion between the vehicle occupant and interior surfaces of the vehicle.

BRIEF DESCRIPTION OF DRAWINGS

The detailed description is described with reference to the accompanying figures. The use of the same reference numbers in different figures indicates similar or identical components or features.

FIG. 3B is a perspective internal view of the example vehicle doors of FIG. 3A.

FIG. 4 is a partial cross-sectional view of the example vehicle doors of FIG. 3B showing first and second door panels or door panel regions and airtight, deformable containers with pressure sensors.

FIG. 5 is a schematic view illustrating example first and second panels or panel regions of a vehicle and an airtight, deformable container with a pressure sensor.

DETAILED DESCRIPTION

Figure 1:
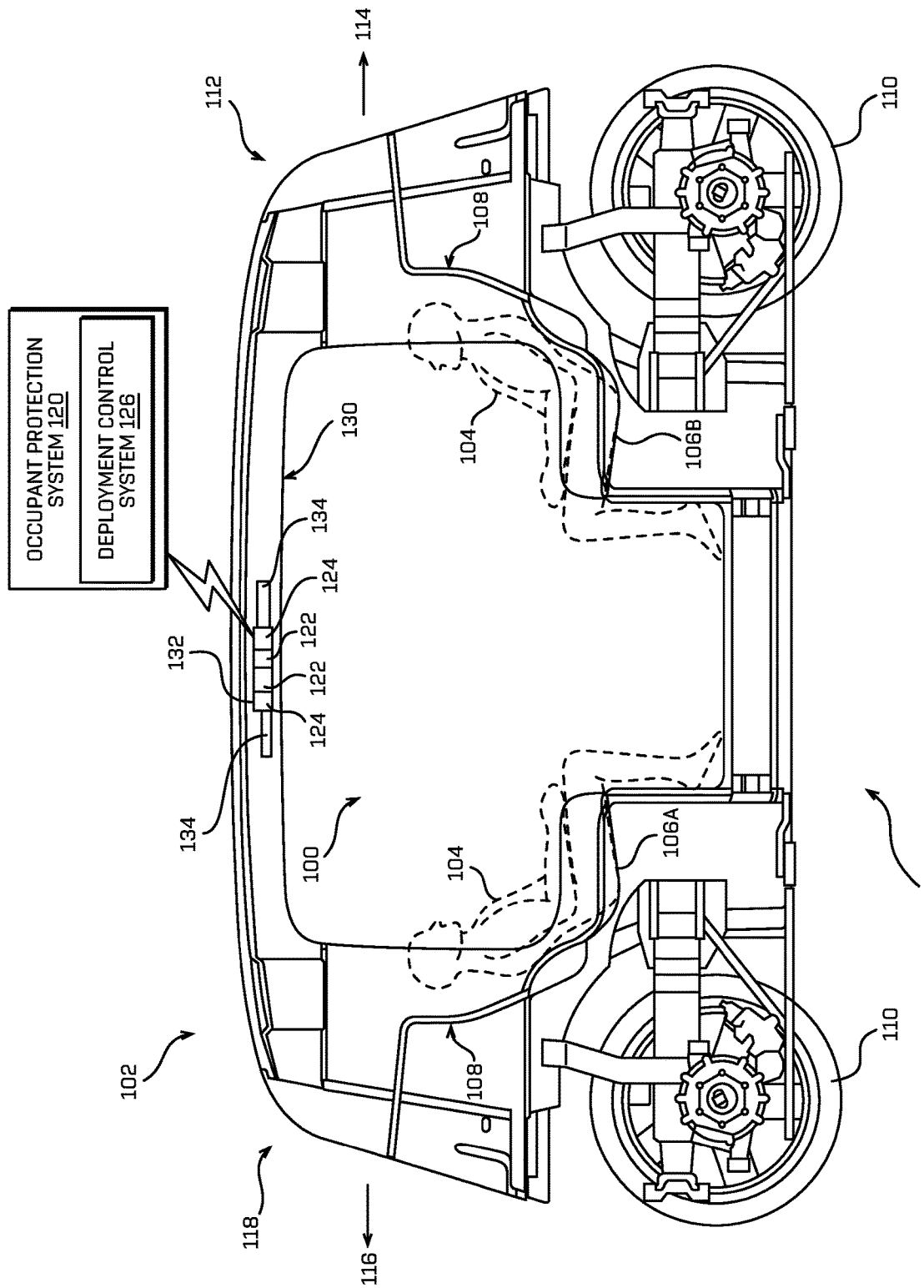
FIG. 1 is a cutaway side view of an example vehicle including an example occupant protection system.

Vehicle occupant protection systems such as airbag systems or seatbelt systems protect occupants of a vehicle during a collision. An airbag system may include at least one airbag (e.g., a side airbag, an expandable bladder, and/or an expandable curtain) and at least one inflator for providing the airbag with a gas to inflate the airbag. Upon involvement in a collision, the airbag may rapidly inflate to create a cushion between the occupant in the vehicle and one or more interior surfaces of the vehicle. Different vehicle designs may result in difficulty in protecting vehicle occupants with an airbag system or present other problems. For example, in a vehicle with a carriage style seating arrangement, an airbag may be deployed from a roof area near a center of the interior of the vehicle and/or a vehicle occupant may be seated close to, or directly abutting an area of a vehicle where a side airbag may be deployed. Because of the occupant's proximity to the area of the vehicle where a side airbag may be deployed and/or due to the airbag's deployment from a center roof area of the vehicle, airbags in such arrangements may not deploy (e.g., provide gas to the airbags) quickly enough for the airbags to adequately protect occupant(s). For example, a side airbag in a vehicle with a carriage style seating arrangement may deploy from a vehicle seat area that directly abuts an occupant's body in a seated position, and thus the side airbag may not deploy quickly enough to adequately protect an occupant, for example, in accordance with the standards of the Rigid Pole Side Impact Test issued by the U.S. Department of Transportation National Highway Traffic Safety Administration ("the Pole Test"). Examples herein may address or mitigate the above-noted drawbacks and address other problems with vehicle occupant protection systems.

The present application generally relates to vehicles having occupant protection systems with at least one airtight, deformable container with at least one pressure sensor for generating a vehicle collision signal that enables an occupant protection system to be activated quickly upon involvement in a vehicle collision (e.g., a side airbag in a vehicle having a carriage style seating arrangement to be activated quickly). In examples, the airtight, deformable container may be coupled to the vehicle, or be defined by vehicle component(s), such as panels or panel regions. The deformable container in examples may be constructed and arranged to be airtight so that one or more gases held in the container (e.g., air) cannot escape from the container when the container undergoes deformation due to an impact of a vehicle collision. The airtight container may be deformable in that it may be formed of any shape and/or material suitable for allowing the container to deform due to the impact of a vehicle collision without rupturing the container so that the gas(es) held in the container do not escape during the collision and the pressure inside the container increases as a result of the deformation.

In examples, the airtight, deformable container may comprise at least one pressure sensor configured to generate a vehicle collision signal when an impact from a vehicle collision causes the container to deform. In examples, the pressure sensor may be configured to generate the vehicle collision signal when an increase in pressure is detected in the container resulting from the container's deformation.

The at least one airbag of the occupant protection system (e.g., a side airbag, expandable bladder, and/or expandable curtain) may be configured to expand between a stowed state and a deployed state. The vehicle occupant protection system in examples may further comprise a deployment control system and at least one inflator configured to provide gas to the airbag. The deployment control system may be configured to receive the vehicle collision signal from the pressure sensor and provide gas from the inflator(s) to the airbag based upon the signal to thereby cause the airbag to expand from the stowed state to the deployed state. Because the container is airtight and constructed and arranged to deform without rupturing during a vehicle collision, the container's deformation from the impact of a collision enables the pressure sensor to quickly detect a pressure increase within the container and thus quickly generate and communicate a vehicle collision signal to the deployment control system. The deployment control system can accordingly use the signal to activate a vehicle occupant protection system quickly (e.g., activate an airbag quickly after an impact from a collision and so that the airbag deploys quickly upon impact). This can be particularly advantageous, for example, in a vehicle in which an occupant may be seated close to, or directly abutting, an area of the vehicle from which a side airbag deploys (e.g., a vehicle having a carriage style seating arrangement) where a side airbag may deploy from a location close to, or directly abutting a hip of a seated occupant.

In examples, the deformable container may be considered airtight or sealed from air leakage in that it may hold a sufficient amount of air within the container during deformation from a collision that allows pressure to increase in the container so the sensor can generate a vehicle collision signal and communicate the signal to a deployment control system for the control system to cause gas to be provided from at least one inflator to at least one airbag within a prescribed amount of time of the container deforming. In examples, the deployment control system may be configured to provide gas to an inflator of an airbag system, such as gas to one or more side airbag (e.g., side airbag 402 discussed below and associated with a vehicle having a carriage style seating arrangement), within (i) 10 milliseconds or less of the container deforming to generate a vehicle collision signal, (ii) 9 milliseconds or less of the container deforming to generate the vehicle collision signal, (iii) 8 milliseconds or less of the container deforming to generate the vehicle collision signal, (iv) 5 milliseconds or less from less of the container deforming to generate the vehicle collision signal, or (v) 3 milliseconds or less of the container deforming to generate the vehicle collision signal. In examples, the activation of the airbag or airbag system within any of the above times may be an activation of a side airbag (such as side airbag 402 discussed below and associated with a vehicle having a carriage style seating arrangement) that occurs in accordance with the standards of the Pole Test.

In examples, a size or internal volume of the airtight, deformable container may be advantageously minimized so that the amount of volume needed to be displaced to increase the pressure within the container during deformation due to a vehicle collision is minimized. Because less volume needs to be displaced within a small container, the pressure sensor of such container can sense a pressure increase and generate the vehicle collision signal more quickly. The vehicle occupant protection system can accordingly be activated quickly upon collision (e.g., one or more airbag systems or seatbelt systems can be activated quickly upon impact from a collision). In examples, the internal volume of the airtight, deformable container prior to any deformation may be as small as 35,000 mm$^3$. In one example, the container may comprise a substantially cylindrical shape with a height of 50 mm and a radius of 15 mm, thus having an internal volume of about 35,343 mm$^3$. In other examples, the airtight, deformable container may have any volume or size suitable for allowing the container to deform due to an impact of a collision without rupturing from the impact, while simultaneously enabling a pressure sensor to sense or detect a pressure signal within the container so as to generate a vehicle collision signal quickly after the impact occurs. In examples, the pressure sensor may be selected to be as small as possible to allow an increase in pressure in the container to be detect during deformation so that the pressure sensor can generate a vehicle collision signal. Thus, the container size may be selected to be the smallest size possible for enclosing such smallest possible pressures sensor, while still enabling air to be held in the container during deformation and the sensor to sense an increase in pressure from the deformation due to a vehicle collision. In various examples, the shape of the container may be at least substantially cylindrical. In other examples, the shape of the container may be at least substantially cushion or pillow like shaped. A cushion like shape in examples may be considered an enclosed three dimensional shape having four edges.

In examples, the airtight, deformable container may be positioned at an advantageous location of the vehicle that enables the container to deform as quickly as possible upon impact from a collision and thus activate the vehicle occupant protection system as quickly as possible after such impact. In examples, the container may be located between any two panels or panel regions of a vehicle, or located on or near a vehicle door or between panels or panel regions of a vehicle door. In various examples, the deformable, airtight container may be positioned on, or in, a front or rear longitudinal area of a vehicle (e.g., a front or rear bumper region or crumple zone) so as to detect a front or rear collision as quickly as possible after such collision(s). In examples, the deformable airtight container may be positioned at any location that statistical evidence may demonstrate as more likely to be subject to a direct impact from a collision and/or more likely to be able to quickly detect the impact of a collision. In further examples, the deformable, airtight container may be positioned at any location on or within any suitable components of a vehicle, or any location considered most likely to quickly detect an impact from a collision and generate the vehicle collision signal. In examples, one or more components of the vehicle my comprise one or more components of a vehicle chassis, one or more components of a vehicle door coupled to the chassis, or any other suitable vehicle components. In various examples, the airtight, deformable container may be defined by interior and exterior panels or panel regions of a vehicle such that the panels or panel areas create a closed volume or airtight vessel that can deform during a collision without allowing any air to escape during the deformation.

In further examples, the airtight, deformable container may comprise more than one container. As with a single container, the multiple containers in examples may be advantageously positioned at any suitable area or region of the vehicle such as locations that statistical evidence may demonstrate as more likely to be subject to a direct impact from a collision and/or more likely to quickly detect a collision. The multiple containers may be attached or coupled to any suitable components of the vehicle and/or may defined by any vehicle components such as by panel(s) or panel region(s) of a vehicle. In examples, each of the multiple airtight containers may comprise at least one pressure sensor configured to generate a vehicle collision signal. In examples, the deployment control system may be configured to receive a signal from any one of the multiple pressure sensors to cause an inflator to provide gas to at least one airbag. In at least one example, the deployment control system may cause at least one inflator to provide gas to at least one airbag upon receiving the first vehicle collision signal from a single pressure sensor of one of the multiple containers.

Referring now more specifically to the figures, FIG. 1 is a side cutaway view showing an interior 100 of an example vehicle 102 of the present disclosure including a pair of occupants 104. The example vehicle 102 may be configured to travel via a road network from one geographic location to a destination carrying one or more of the occupants 104. For example, interior 100 may include seats 106, which may be provided in any relative arrangement. Example vehicle 102 shown in FIG. 1 includes an example carriage-style seating arrangement in a substantially central portion of the interior 100 of the vehicle 102. For example, the vehicle 102 may include two or more rows 108 of seats 106, and in some examples, two of the rows 108 of seats 106 may face each other, for example, as shown in FIG. 1. One or more of the rows 108 of the seats 106 may include two seats 106 (e.g., seats 106A and 106B). Other relative arrangements and numbers of seats 106 are contemplated. In examples of such vehicles comprising a carriage style seating arrangement, a distance between an occupant centerline or a center of a row to an exterior surface of the vehicle in a horizontal direction (e.g., a distance from the center of the vehicle seat to an exterior surface of the vehicle, which would be going into or out of the page or in a horizontal direction in the example vehicle 102 that is illustrated in FIG. 1) may be about 527 mm. In other examples, such distance may be (i) 500 mm, (ii) 600 mm, (iii) in a range between 400-500 mm, or (iv) in range between 500 mm-600 mm.

For purpose of illustration, the vehicle 102 may be a driverless vehicle, such as an autonomous vehicle configured to operate according to a Level 5 classification issued by the U.S. Department of Transportation National Highway Traffic Safety Administration the U.S. Department of Transportation National Highway Traffic Safety Administration, which describes a vehicle capable of performing all safety-critical functions for the entire trip, with the driver (or occupant) not being expected to control the vehicle at any time. In such examples, because the vehicle 102 may be configured to control all functions from start to completion of the trip, including all parking functions, it may not include a driver and/or controls for driving the vehicle 102, such as a steering wheel, an acceleration pedal, and/or a brake pedal. This is merely an example, and the systems, vehicles occupant protection systems, expandable bladders and methods described herein may be incorporated into any ground-borne, airborne, or waterborne vehicle, including those ranging from vehicles that need to be manually controlled by a driver at all times, to those that are partially or fully autonomously controlled.

The example vehicle 102 may be any configuration of vehicle, such as, for example, a van, a sport utility vehicle, a cross-over vehicle, a truck, a bus, an agricultural vehicle, and a construction vehicle. The vehicle 102 may be powered by one or more internal combustion engines, one or more electric motors, hydrogen power, any combination thereof, and/or any other suitable power sources. Although the example vehicle 102 has four wheels 110, the systems and methods described herein may be incorporated into vehicles having fewer or a greater number of wheels, tires, and/or tracks. The example vehicle 102 may have four-wheel steering and may operate generally with equal performance characteristics in all directions, for example, such that a first end 112 of the vehicle 102 is the front end of the vehicle 102 when travelling in a first direction 114, and such that the first end 112 becomes the rear end of the vehicle 102 when traveling in the opposite, second direction 116, as shown in FIG. 1. Similarly, a second end 118 of the vehicle 102 is the front end of the vehicle 102 when travelling in the second direction 116, and such that the second end 118 becomes the rear end of the vehicle 102 when traveling in the opposite, first direction 114. These example characteristics may facilitate greater maneuverability, for example, in small spaces or crowded environments, such as parking lots and urban areas.

As shown in FIG. 1, the vehicle 102 may include an occupant protection system 120 configured to protect one or more of the occupants 104 during a collision involving the vehicle 102. For example, the occupant protection system 120 may include one or more expandable bladders or airbags 124 or and a deployment control system 126. The occupant protection system 120 may in examples further comprise one or more expandable curtains 122 and one or more side airbags (discussed in more detail below). It should be appreciated that each of the expandable bladders, side airbags, and expandable curtains described herein may be considered airbags or part of an airbag system. The deployment control system 126 may be configured to control deployment of one or more of the airbags or expandable curtains 122 and one or more of the airbags or expandable bladders 124, so that they deploy from a stowed state, for example, as shown in FIG. 1, to one or more deployed states (e.g., expanded states or at least partially expanded states), for example, as shown in FIGS. 2-5, 7A-7C and 9. In some examples, the occupant protection system 120 may also include a seatbelt system that includes a seatbelt for each of one or more of the occupants 104, for example, as explained in more detail herein. The expandable curtain 122 and/or the expandable bladders 124 may be formed from, for example, a woven nylon fabric and/or other similar materials, or materials having suitable characteristics for the vehicles and occupant protection systems described herein.

Figure 6:
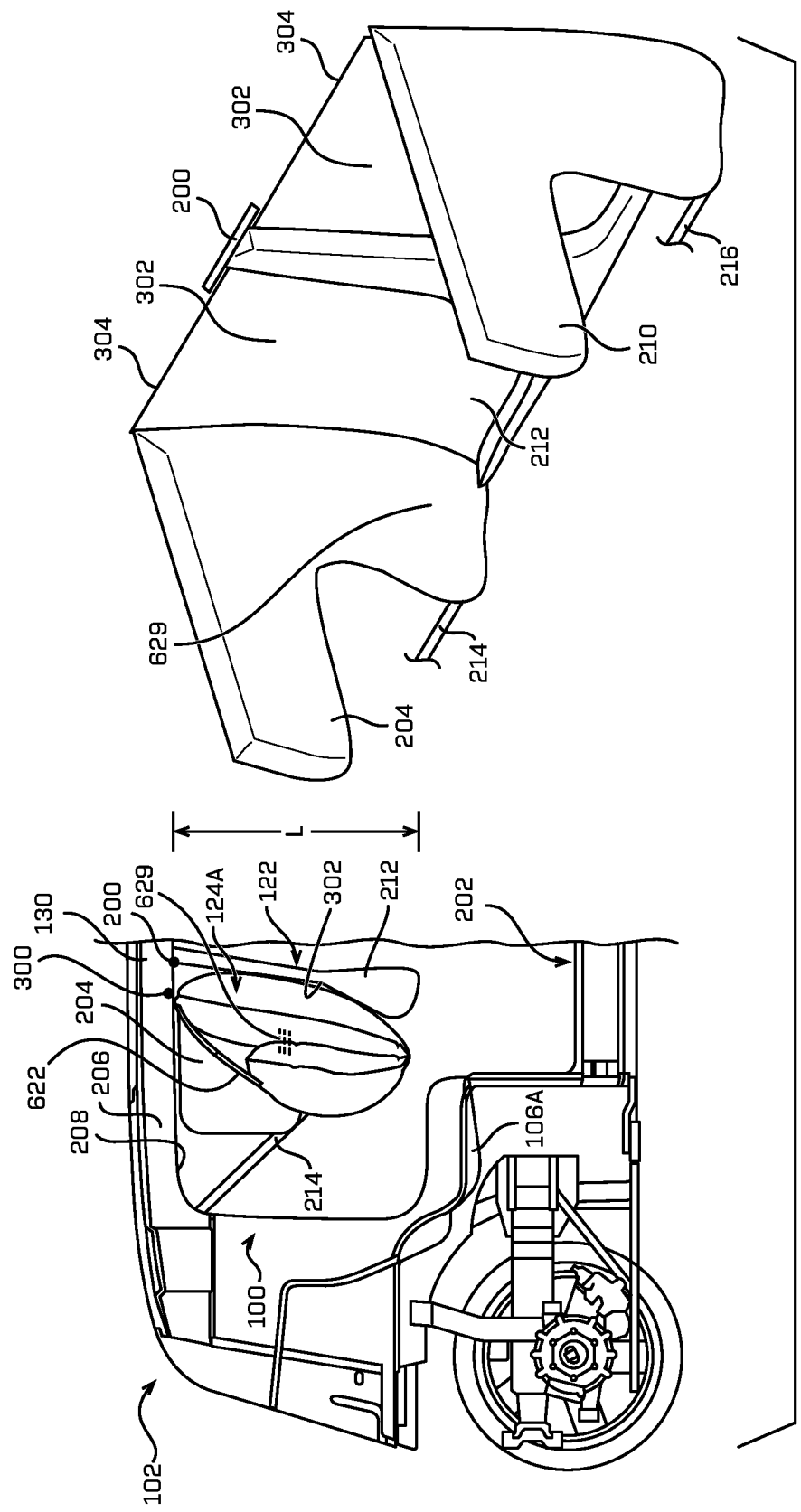
FIG. 6 is a partial side view of the example vehicle shown in FIG. 1 including an example airbag comprising an example expandable curtain in a deployed state.

As shown in FIG. 1, the example vehicle 102 may include a chassis 128 including a vehicle roof 130 having a housing 132 configured to receive the expandable curtain(s) 122 and/or the expandable bladder(s) 124, each in the stowed state (e.g., unexpanded state). One or more vehicle doors (e.g., doors 10 and 12 illustrated and described in FIGS. 3A, 3B, and 4) may be coupled to and moveable relative to chassis 128 as described further herein, for example. In some examples, the expandable curtain(s) 122 and/or expandable bladder(s) 124 may be stored individually in separate housings. In some examples (e.g., those examples where portions of the expandable curtain(s) are separate), each portion may be stored individually in separate housings. In some examples, upon receipt of one or more signals from the vehicle 102 (e.g., receipt from one or more vehicle sensor or sensor systems discussed herein including one or more of pressure sensors $32a$-$32f$ or $90c$ of the airtight deformable pressure containers as described with respect to FIGS. 3A, 3B, 4 and 5), the deployment control system 126 may be configured to activate one or more inflators 134 in fluid or flow communication with the airbag(s) or expandable curtain(s) 122 and/or the airbag(s) or expandable bladder(s) 124, such that the inflators 134 provide a fluid or gas to the expandable curtain(s) 122 and/or the expandable bladder(s) 124, so that that the expandable curtain(s) 122 and/or the expandable bladder(s) 124 may expand from their stowed state (FIG. 1) to their respective deployed states, for example, as shown in FIGS. 4-6. For example, the inflators 134 may include a gas generator, pyrotechnic charge, propellants, and/or any other suitable devices or systems. In examples, a ceiling trim panel of a ceiling of the vehicle 102 may at least partially define the housing 132, and the housing 132 may be coupled to the ceiling and/or the vehicle roof 130 of vehicle 102. Additional details of example housings, ceilings, ceiling trim panels, and occupant protection systems that operate with activatable inflators for expanding bladders and curtains may be found, for example, in U.S. patent application Ser. No. 16/368,603 (U.S. Pat. No. 10,960,844), the entire contents of which is incorporated herein for all purposes.

In examples, the deployed state may include first and second phases, which first and second states may be, for example, as described in U.S. application Ser. No. 17/555,206, incorporated herein by reference in its entirety for all purposes. As explained herein, the expandable curtain(s) 122 and/or the expandable bladder(s) 124, in the deployed state may protect an occupant 104 from injury (or reduce its likelihood or severity) during a collision involving the vehicle 102 by providing a cushion between the occupant 104 and interior structures of the vehicle 102, so that the occupant 104 will be prevented from being thrown into the interior structures and/or, in some instances, being ejected from the vehicle 102.

Figure 2A:
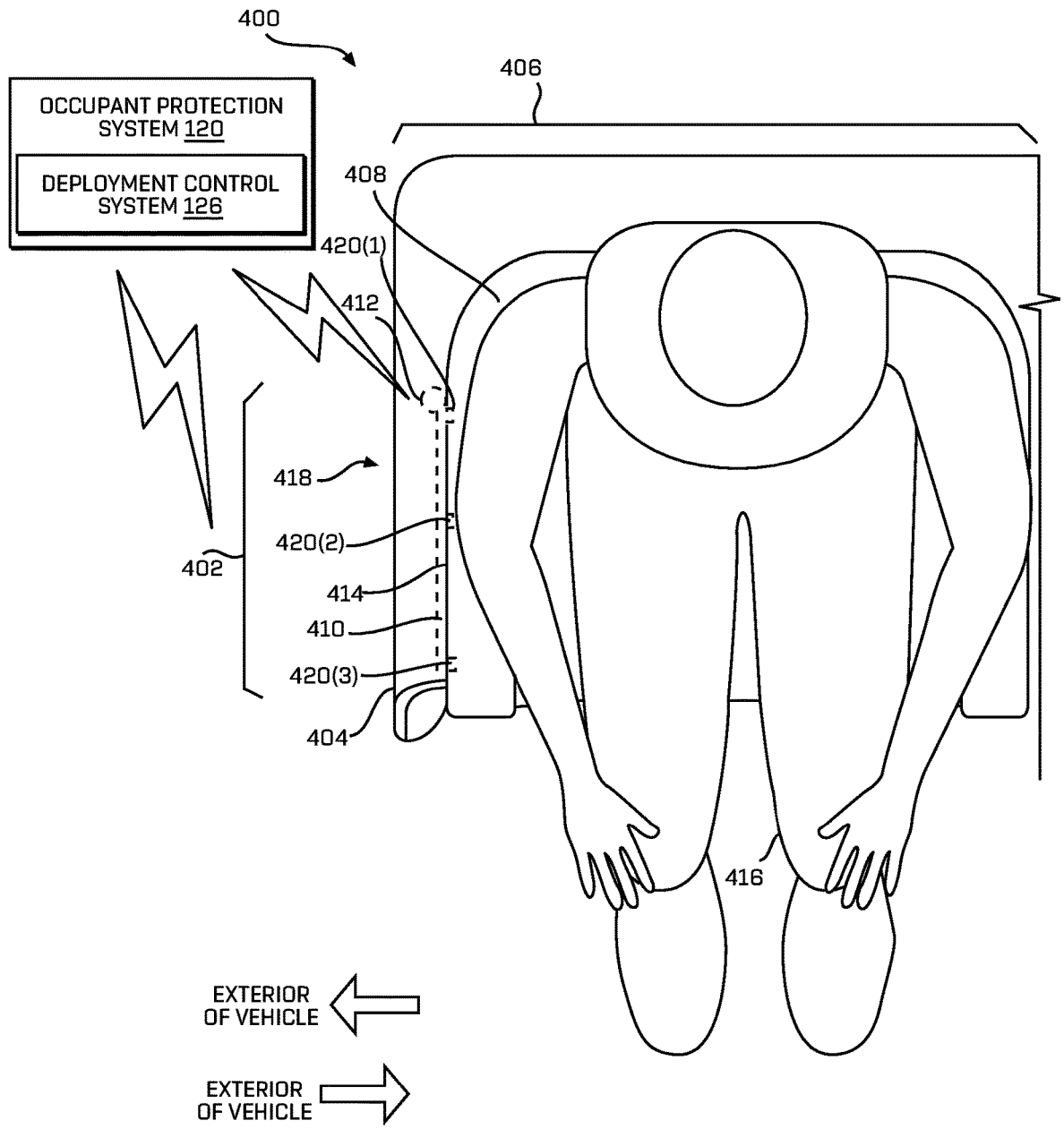
FIG. 2A is a top view of an example side airbag mounted in an example seat assembly and tub for use with the example vehicle of FIG. 1 in which an example side airbag is in a stowed position.
Figure 2B:
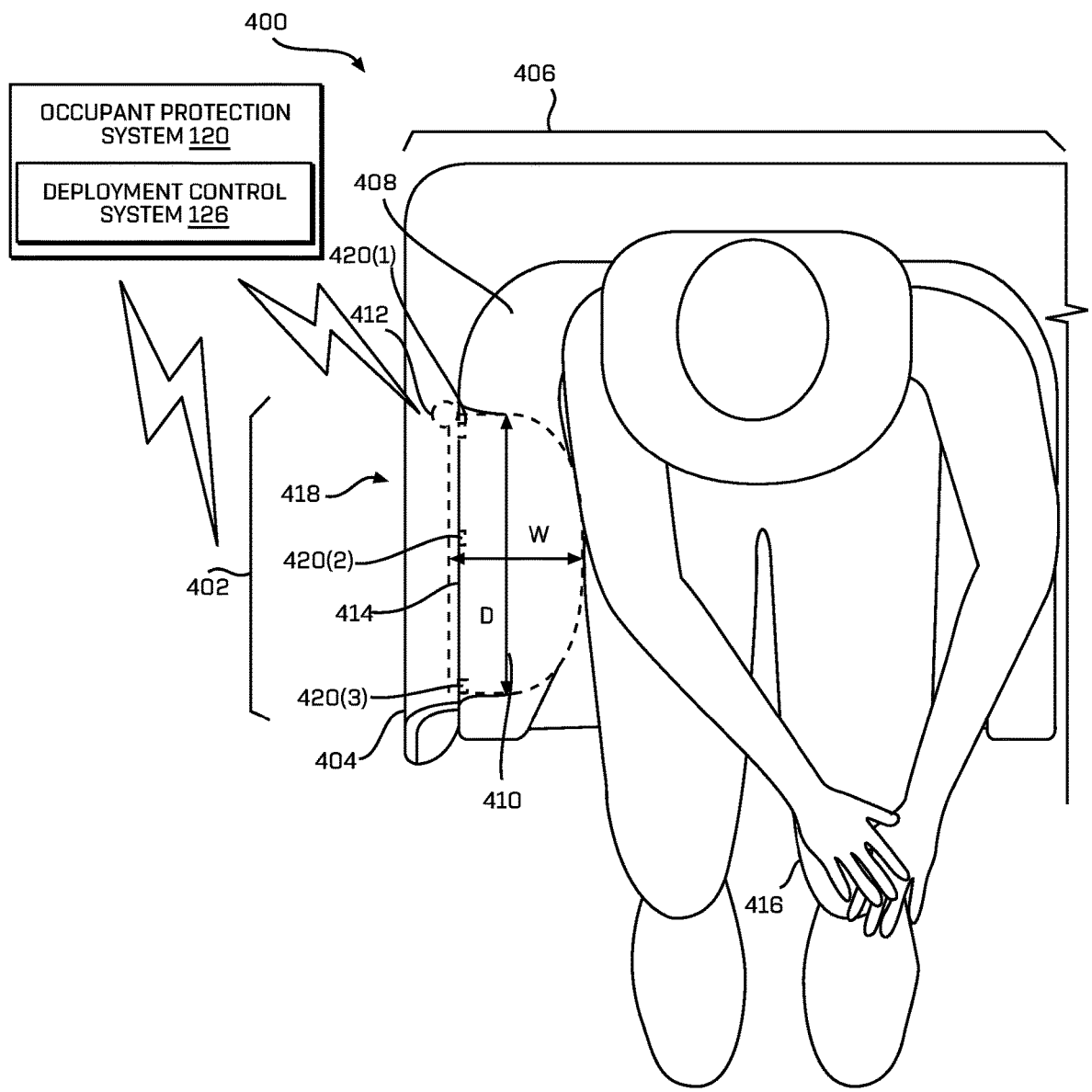
FIG. 2B is a top view of the example side airbag of FIG. 2A mounted in the example seat assembly and tub for use with the example vehicle of FIG. 1 in which the example side airbag is in a deployed position.

Turning now to FIGS. 2A, 2B, FIGS. 2A and 2B are top views 400 of an example side airbag 402 mounted in an example seat tub 404 for use in example vehicles of the present disclosure, including the example vehicle 102 of FIG. 1. The seat tub 404 may comprise a receiver for coupling to at least a portion of a seat cushion 408 and/or a seat pan (not illustrated). Such a seat tub 404 may, for example, be used to couple a seat cushion 408, via the seat pan, to a vehicle chassis such as chassis 128 of vehicle 102 in FIG. 1. FIG. 2A illustrates the example side airbag 402 in a stowed (e.g., uninflated) position. In various examples, a seat assembly 406 of the vehicle may include the seat tub 404 and a seat cushion 408. In examples, the vehicles herein may include one or more seat assemblies 406. In some examples, the vehicles may include a pair of opposing seat assemblies 406 that face each other within a passenger compartment of the vehicle.

In examples, the seat tub and/or the seat pan may include a plastic material (e.g., polypropylene, polyethylene, etc.), a metal material (e.g., aluminum, titanium, etc.), a composite material (e.g., carbon fiber, fiber glass, etc.), or a combination thereof. In at least one example, the seat tub 404 may include a polypropylene material. The seat cushion 408 may include a foam material (e.g., polystyrene, polyethylene, etc.), a polyurethane material, a rubber material (e.g., polyisoprene, EPDM ethylene propylene, neoprene, etc.), a fabric material (e.g., cotton, polypropylene, etc.), or a combination thereof. In at least one example, the seat cushion 108 may include a polyurethane material.

In various examples, the occupant protection system 120, which may include the deployment control system 126 (as illustrated, for example, in the vehicle of FIG. 1 and in the illustrations of FIGS. 9 and 10) may include the example side airbag 402 and an inflator 412 (and one or more such side airbags as discussed herein). In some examples, side airbag 402 may include a chamber 410, which may include two or more compartments configured to hold gas. In such examples, the compartments may be the same or different sizes, shapes, materials, etc. In some examples, the compartments may be configured to hold the same or different gas pressures. In examples, the chamber 410 may include a single compartment configured to hold gas. The chamber 410 may include a fabric material, such as, for example, nylon, cotton, silk, polyester, wool, or the like. The inflator 412 may include a pyrotechnic inflator, a cold gas inflator, a compressed gas inflator, a hybrid inflator, or the like. In example, the deployment control system 126 illustrated in FIGS. 2A, 2B (and FIGS. 1, 9 and 10) may be configured to receive a vehicle control signal from one or more of the pressure sensors of the airtight, deformable containers described herein to cause the inflator 412 to provide gas to the chamber 410 to fill chamber 410 with gas during deployment.

In the illustrated example, the side airbag 402 is coupled on an interior surface 414 of a side portion of the seat tub 404. The interior surface 414 of the seat tub 404 may include a surface located proximal to a passenger 416 (e.g., farthest from a chassis of the vehicle). In some examples, the side airbag 402 may be coupled to an exterior surface 418 of the seat tub 404. In examples, the side airbag 402 may be coupled to a vehicle chassis, such as, for example, an external seat frame to which the seat assembly 406 may be coupled. In various examples, the seat tub 404 may include a portion of the external seat frame.

In various examples, the side airbag 402 may be coupled to the seat tub 404 and/or external seat frame via one or more couplings 420. The coupling(s) 420 may include snap-fit couplings, screws, rivets, spring-type couplings, or any other mechanical coupling configured to securely couple the side airbag 402 to a surface. In the illustrative example, the side airbag 402 is coupled to the seat tub 404 with three couplings 420(1), 420(2), and 420(3). In other examples, the side airbag 402 may be coupled to the seat tub 404 and/or external seat frame (of the vehicle chassis) with a greater or lesser number of couplings 420.

In various examples, the side airbag 402 may be mounted (e.g., coupled to the seat tub 404 and/or the external seat frame) in a folded position. In such examples, the side airbag 402 may be folded in a roll fold, a tuck fold, a z-fold, origami-inspired fold, and/or any other style of fold of an airbag. The side airbag 402 may be stored in a folded position and mounted in a storage container. In such examples, the storage container may be coupled to the seat tub 404 and/or the vehicle frame (of the vehicle chassis). In at least one example, the side airbag 402 may be mounted in an unfolded position. In such an example, the side airbag 402 may be configured to deploy at a faster rate than an airbag mounted in the folded position.

FIG. 2B illustrates the example side airbag in an extended (e.g., deployed) position. As discussed above, the inflator 412 may be configured to deploy (e.g., inflator 412 fills chamber 410 with gas) the side airbag 402 based on the deployment control system 126 receiving a vehicle collision signal from one or more of the pressure sensors of the airtight, deformable containers described herein. The inflator 412 may fill the chamber 410 with gas, causing the chamber 410 to expand toward the passenger 416. The inflator 412 may be configured to deploy the airbag a width W horizontally toward the passenger 416. In at least one example, the width W may be 190 millimeters. In other examples, the width W may be another distance greater or lesser than 190 millimeters (e.g., 150 millimeters, 175 millimeters, 200 millimeters, 250 millimeters, etc.). Additionally, the inflator 412 may be configured to deploy the airbag a depth D parallel to the passenger 416. In at least one example, the depth D may be 350 millimeters. In other examples, the depth D may be another distance greater or lesser than 350 millimeters (e.g., 300 millimeters, 325 millimeters, 375 millimeters, 400 millimeters, etc.).

In various examples, a deployment of the side airbag 402 may cause one or more components of the seat assembly to extend from the uninflated position, such as that shown in FIG. 2A. In some examples, at least part of a side portion of the seat tub 404 (e.g., part of the side portion proximate to the passenger) may be configured to deform due to pressures imparted upon it by the deployed side airbag 402. In various examples, the portion of the seat tub 404 may include a trim of the seat tub 404. In such examples, the side airbag 402 may be situated between the trim and a surface of the seat tub 404. The side airbag 402 in examples may be configured to deploy through an opening in the seat tub 404. In such examples, the seat tub 404 may not deform or may experience negligible deformity, such as, for example, a slight deformity around the edges of the opening in the seat tub. In some examples, the side airbag 402 may be coupled to an interior surface 414 of the seat tub 404 proximal to the passenger. In such examples, the seat tub 404 may experience no deformity or substantially no deformity upon side airbag 402 deployment.

Additionally, or in the alternative, the seat cushion 408 of the seat assembly 406 may deform due to pressures imparted upon it by the deployed side airbag 402. In examples, the seat cushion 408 may include a soft, pliable material configured to deform under pressure. In some examples, the deformed seat cushion 408 may be the surface the passenger 416 contacts upon side airbag 402 deployment. In such examples, the seat cushion 408 may prevent at least part of the passenger's 416 body (e.g., hips, thorax, etc.) from excessive acceleration resultant from a side impact with an object. Further details of side airbag(s), seat assemblies and seat tub(s) may be found in U.S. patent application Ser. No. 16/140,259 (U.S. Pat. No. 11,091,113), the entire contents of which is incorporated herein by reference for all purposes.

Figure 3A:
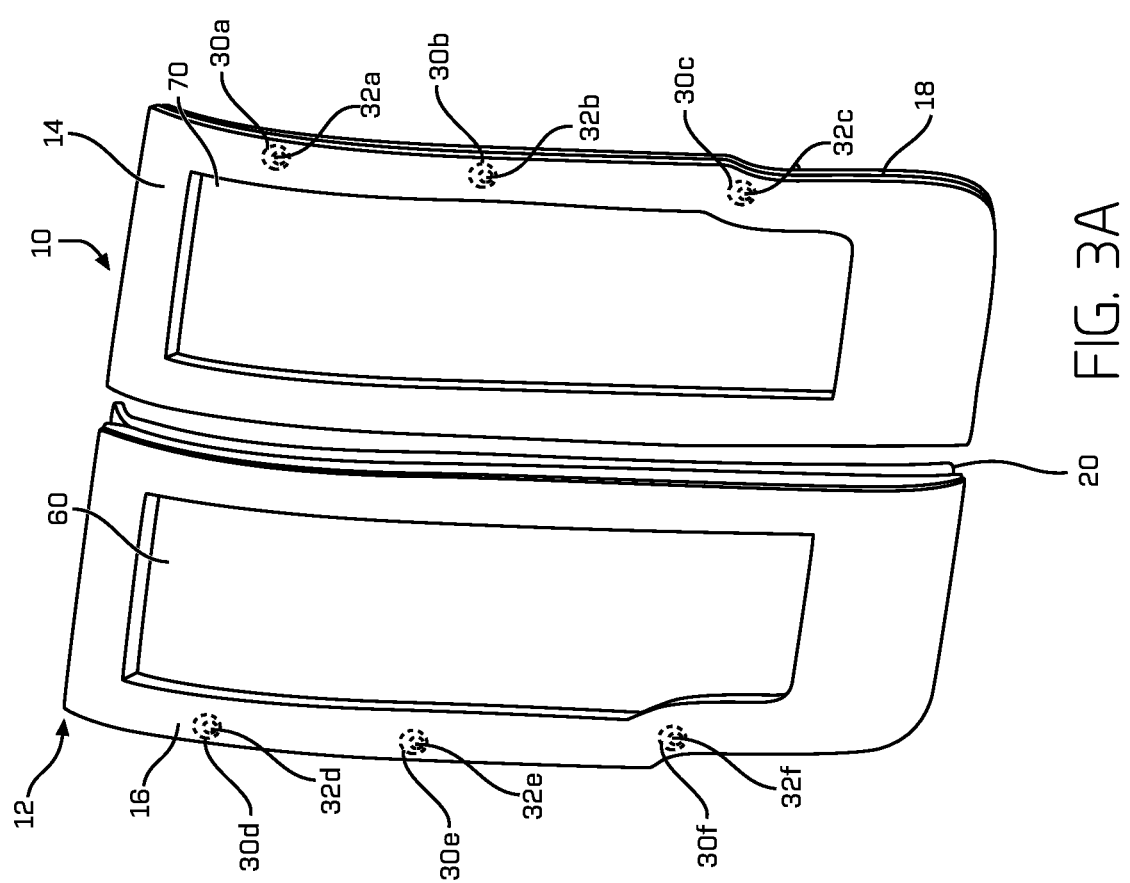
FIG. 3A is a perspective external view of example vehicle doors for use with the example vehicle of FIG. 1 in which the doors comprise an airtight, deformable container with a pressure sensor for generating a vehicle collision signal.

FIGS. 3A and 3B are external and internal perspective views, respectively, of example vehicle doors for example vehicles of the present disclosure (including example vehicle 102 of FIG. 1) in which the vehicles comprise occupant protection systems having one or more airtight, deformable pressure containers or vessels. Each container in these examples has at least one pressure sensor. It should be understood that the views of FIGS. 3A, 3B are taken from a perspective of one looking from an interior and exterior, respectively, of an example vehicle such as example vehicle 102 of FIG. 1. FIG. 4 is a cross-sectional view of FIG. 3A. It should be appreciated that certain components of the doors in the cross-sectional view of FIG. 3 are omitted for ease of illustration and clarity (e.g., vehicle door frames in examples).

Thus, referring to FIGS. 3A, 3B, and 4, examples of the present disclosure comprise a vehicle (e.g., vehicle 102) having a first vehicle door 10 and a second vehicle door 12. It should be appreciated that in various examples, any of the vehicles or the vehicle door(s) herein may comprise only a single door or more than two doors. The first door 10 in examples may be coupled to a chassis of a vehicle (e.g., chassis 128 of vehicle 102) and moveable relative to the chassis. The second door 12 may likewise be coupled to a chassis of a vehicle (e.g., chassis 128 of vehicle 102) and moveable relative to the chassis. The first and second vehicle doors 10, 12, in examples, may move relative to one another and each door 10, 12 may pivot, rotate and/or translate relative to the chassis (e.g., chassis 128 of vehicle 102). In examples, doors 10, 12 may open and close automatically and move relative to each other and to the chassis via one or more hingeable connections or any other suitable attachment mechanism(s) that allow the door(s) to open and close and move relative to each other and the vehicle's chassis. It should thus be appreciated that in various examples, doors 10, 12 may be coupled and moveable relative to chassis 128 of vehicle 102 in examples and may close so that they generally fill or enclose the open area shown between the occupants 104 in the vehicle 102 of FIG. 1.

In various examples, any of the vehicle chassis described herein (e.g., chassis 128 of vehicle 102 in FIG. 1) may be considered a body of a vehicle and may comprise carbon fiber. The chassis in examples may comprise any material suitable to serve as a vehicle body and/or a vehicle frame, such as steel or aluminum. In examples, the chassis may comprise a floor area, platform and/or a frame that may be separately attached to a body, or may comprise a floor area, platform and/or frame that is formed as a single continuous or integral component with a body. The term chassis as used herein should therefore not be limited to vehicles having either a unibody construction or a body-on-frame construction. In examples, the term chassis as used herein may comprise a body-on-frame construction or a unibody construction and thus the term chassis may comprise a vehicle body, a vehicle frame, or both a vehicle body and a vehicle frame. The term chassis may comprise any vehicle structure suitable for comprising, or coupling thereto, any of the airtight, deformable containers having pressure sensors for generating a vehicle collision signal described herein.

In examples of the present disclosure and still referring to FIGS. 3A, 3B, and 4, the first vehicle door 10 may comprise a first or exterior panel 14 (e.g., an exterior skin or exterior skin portion) and a second or interior panel 18 (e.g., an interior skin or interior skin portion). Each panel 14, 18 in examples may be attached to the door 10 such as attached to a frame (not illustrated) of the door 10. In examples, the interior and exterior panels 14, 18 may be formed as a unitary piece or as one or more separate pieces. The second vehicle door 12 may similarly comprise a first or exterior panel 16 (e.g., an exterior skin or exterior skin portion) and a second or interior panel 20 (e.g., an interior skin or interior skin portion). Each panel 16, 20 in examples may be attached to the door 12 such as attached to a frame (not illustrated) of the door 12. The exterior and interior panels 16, 20 may each be formed as a unitary piece or one or more separate pieces. Panels 14, 16 and panels 18, 20 may be attached to respective doors 10, 12 via any suitable attachment mechanism or technique, which in various examples, may be an adhesive attachment. It should be appreciated that panels 14, 16 and 18, 20 may extend generally in a longitudinal or horizontal direction (i.e., generally from left to right in FIGS. 3A, 3B) and generally in a vertical or lateral direction (i.e., generally up and down in FIGS. 3A, 3B) so as to cover the frames of the doors 10, 12 in various examples.

In examples, each door 10, 12 may comprise a respective window 70, 60. Windows 70, 60 in examples may be secured or attached to a portion of doors 10, 12 so as to face an exterior or exterior of a vehicle such as attached to the interior or exterior panels 14, 16 or attached to a respective frame of doors 10, 12. In examples, windows 70, 60 may be attached to any portion of the front edge portions or front facing edge portions of doors 10, 12. In various examples, windows 70, 60 define at least a portion of exterior face of the vehicle doors. Windows 70, 60 in examples may extend, in a generally lateral direction beyond or past the edges of door frames. In examples, windows 70, 60 may be attached or otherwise secure to the vehicle doors 10, 12 at one or more protrusions of vehicle door frames. It should be appreciated that the attachment of windows 60, 70 to doors 10, 12 or frames of the doors may be via any suitable attachment mechanism or technique, which in various examples, may be an adhesive attachment.

In examples, the vehicles and vehicle occupant protection systems of the present disclosure may comprise one or more airtight, deformable pressure containers or vessels 30*a*-30*f*.

The airtight, deformable pressure containers 30a-30f in examples may be formed in a generally cylindrical shape as illustrated and of a material and size to enable deformation without rupturing from an impact of a vehicle collision. In other examples, the pressure containers herein may be cushion or pillow like shape, or any other suitable shape and/or size to enable deformation without rupturing during a collision. Each of the illustrated airtight, deformable containers 30a-30f may have a length or height that extends generally in a lateral or horizontal direction from a respective first or interior panel to a second or exterior panel. For example, referring to FIG. 3, airtight, deformable container 30c may comprise a length or height 1 extending generally laterally or horizontally from exterior panel 14 to interior panel 18 of door 10. Similarly, airtight, deformable container 30f may comprise a length or height 1 extending from exterior panel 16 to interior panel 20 of door 12. Each airtight, deformable container 30c, 30f may be coupled or attached to a respective door 10 or 12. In examples, the containers 30c, 30f may be adhered or coupled to any portion of doors 10, 12. In the illustrated example of FIG. 3, container 30c is attached to respective panels 14, 18 (e.g., adhered to each panel 14, 18) and container 30f is likewise attached to respective panels 16, 20 (e.g., adhered to each panel 16, 20). It should be appreciated that one or more of the other containers 30a, 30b, 30e, 30d may be attached to respective panels in a similar, same or different manner from containers 30c, 30f, in examples.

In examples, the airtight, deformable container 30c may comprise a first area 34 (e.g., a surface area of container 30c located at end area of container 30c) that is coupled to the exterior panel 14 of door 10, and a second area 36 opposite first area 34 (e.g., a surface area of container 30c located at an end area of container 30c opposite to first area 34) coupled to the interior panel 18 of door 10. In examples, only a portion or region 34a of the first area 34 may be attached to the panel 14, and only a portion or region 36a of the second area 36 may be attached to panel 18. The airtight, deformable container 30f may likewise comprise a first area 38 (e.g., a surface area of container 30f located at an end area of container 300 coupled to the exterior panel 16 of door 12, and a second area 40 opposite the first area 38 (e.g., a surface area of container 30f located at an end area of container 30f opposite the first area 38) coupled to the interior panel 20 of door 12. Only a portion or region 38a of area 38 may be attached to the panel 16, and only a portion or region 40a of area 40 may be attached to panel 20. Thus, each of regions 34a, 36a, 38a, 40a may be considered an attached portion or attached area that is attached to a respective door panel, while the remaining portion of each area 34, 36, 38, 40, which is not attached to a respective door panel, may be considered a non-attached portion or non-attached area. The attached and non-attached portions are configured or arranged such that during deformation of the containers 30c, 30f due to a vehicle collision, the non-attached areas or portions contact the respective panels upon deformation from the collision. By having only a portion of the pressure containers (e.g., attached regions 34a, 36a of container 30c, and attached regions 38a, 40a of container 300 attached (e.g., adhered) to respective panels with a remaining non-attached area arranged to contact the panels only upon deformation, upon impact from a vehicle colliding with a door (e.g., an exterior panel), the panels can maintain sufficient relative movement to one another and provide a reaction surface upon which the containers (i.e., the non-attached portions of the containers) may press to deform the containers.

In various examples, the areas 34, 36, 38, and 40 may comprise a shape or formation (e.g., a protruding or concave shape) that extends generally in a lateral direction (i. from one lateral side to the other lateral side of vehicle 102 for example) so as to be able to contact and adhere or attach to a respective panel while having a portion near the same area that does not attach or adhere to the respective panel, but contacts the panel during deformation. It should be appreciated that areas 34, 36, 38, 40 may comprise any suitable shape for attaching the areas to the respective vehicle panels or any components or parts of the doors or to any other vehicle components as described herein. It should also be appreciated that one or more of each of containers 30a, 30b, 30e, 30d may also be attached to respective panels in examples similar to the attachment illustrated and descried for containers 30c, 30f. It still further examples, it should be appreciated that any of the airtight deformable containers described herein may be attached similar to the attachment illustrated and described in FIG. 4, but such attachment may be to components of the vehicles other than vehicle panels or vehicle doors.

Each of the airtight, deformable containers 30a-30f may comprise a respective pressure sensor 32a-32f. The pressure sensors 32a-32f may be any type of pressure sensor suitable for detecting a pressure increase within the airtight, deformable pressure containers herein (which pressure increase is a result of the containers deforming from a vehicle collision) and for generating a vehicle collision signal from a pressure increase. Each pressure sensor 32a-32f may be configured to communicate (e.g., communicate electrically) with a deployment control system (e.g., deployment control system 126 of occupant protection system 120) by sending a vehicle collision signal to the deployment control system. Each pressure sensors 32a-32f may be configured to generate such vehicle collision signal, for example, when a pressure in the respective container increases by a predefined amount, e.g., the pressure increases by a predefined amount as measured in kPa. In other examples, each pressure sensor 32a-32f may be configured to generate such vehicle collision signal when the pressure in the respective container increases to a point where it reaches a predetermined threshold level, e.g., a predetermined threshold level as measured in kPa. In other examples, each pressure sensor 32a-32f may be configured to generate such vehicle collision signal when the pressure in the respective container increases at a predetermined rate of change, e.g., predetermined rate of change measured in kPa/per unit of time. In examples, the deployment control system may be configured to receive a vehicle collision signal from any one of the multiple pressure sensors 32a-32f (or any other airtight, deformable container pressure sensors herein) to cause at least one inflator to provide gas to at least one airbag. While the deployment control system in various examples may be configured to receive a vehicle collision signal from any one of the multiple pressures sensors and each of the multiple sensors may generate such signals, it should be appreciated that the deployment control system may be configured in examples to provide gas from at least one inflator to at least one airbag upon receiving the first vehicle collision signal of the multiple possible vehicle collision signals generated. In other examples, the deployment control system may be configured to cause at least one inflator to provide gas to at least one airbag upon receiving more than one generated vehicle collision signal from the multiple pressure sensors.

In various examples, one or more of the airtight, deformable pressure containers herein may be pressurized above ambient pressure. By pressurizing the container(s) above ambient pressure, the containers may be configured to sense an increase in pressure from a vehicle collision sooner than a container at ambient pressure due to the pressurized container requiring less volume to be displaced in the container i.e., less deformation of the container) to sense an increase in pressure. In various examples, each of the containers 30a-30f may comprise more than one pressure sensor, each sensor of which may be configured to generate a vehicle collision signal due to an increase in pressure in the container during a collision.

In various examples, in addition to or alternative to the airtight, deformable container(s) being coupled to, located on, or defined by vehicle door(s) such as the containers illustrated and discussed with respect to FIGS. 3A, 3B, and 4, the airtight, deformable container(s) herein may be positioned on any other vehicle component such as the vehicle chassis, or be defined by the vehicle chassis itself. In examples, one or more airtight, deformable container(s) may be coupled to panel(s) or panel region(s) of the vehicle, such as quarter panels. In certain examples, the location of such containers may be such that they are closer to, or generally aligned with, a position of a seated occupant's hip, chest region and/or head, such as the chest or head of occupant 104 illustrated in the vehicle 102 of FIG. 1. In that regard and referring now more specifically to FIG. 5, FIG. 5 illustrates schematically one example of an airtight, deformable container 90 coupled to a vehicle (e.g., vehicle chassis 128 of vehicle 102 in FIG. 1). The airtight, deformable container 90 illustrated in FIG. 5 may comprise a first, exterior panel or panel region 50, and a second, interior panel or panel region 65. Each panel 50, 65 may be formed as a unitary piece or as one or more separate pieces. It should be appreciated that panels 50, 65 may extend generally in a longitudinal or horizontal direction.

As with the containers 30a-30f, in examples, container 90 may be formed in a generally cylindrical shape (as illustrated) and of a material and size to enable deformation without rupturing from an impact of a vehicle collision. In other examples, the container 90 may be formed as a cushion or pillow like shape, or any other suitable shape and/or size to enable deformation without rupturing during a collision. Similarly, the airtight, deformable container 90 may have a length or height that extends generally in a lateral or horizontal direction from a respective first or interior panel to a second or exterior panel. For example, referring to FIG. 5, airtight, deformable container 90 may comprise a length or height 1 extending generally laterally or horizontally from exterior panel 50 to interior panel 65. Airtight, deformable container 90 may be coupled or attached to respective panels 50, 65. In examples, the container 90 may be adhered or coupled to any portion of panels 50, 65. In the illustrated example of FIG. 5, container 90 is attached to respective panels 50, 65 (e.g., adhered to each panel 50, 65). It should be appreciated that in examples, there may be more than one container 90 attached to panels 50, 65 each with a pressure sensor. For example, multiple containers may be positioned and attached to panels 50, 65 similar to containers 30a-30f. The multiple other containers may be attached to respective panels 50, 65 in a similar, same or different manner from the container 90 in examples. In various examples, any of the multiple airtight, deformable containers that are coupled to the vehicle components herein may be aligned linearly around a perimeter of a vehicle (i.e., aligned longitudinally from left to right in the vehicle 102 of FIG. 1), as an alternative to or in addition to the generally vertical alignment of the containers as illustrated in FIGS. 3A, 3B. Such alignment may provide greater protection for an occupant due to the containers and their pressure sensors being positioned at a variety of locations that may receive the impact from a collision.

In examples, the airtight, deformable container 90 may comprise a first area 72 (e.g., a surface area of container 90 located at end area of container 90) that is coupled to the exterior panel 50 and a second area 80 opposite first area 72 (e.g., a surface area of container 90 located at an end area of container 90 opposite to first area 72) coupled to the interior panel 65. In examples, similar to the example container illustrated by FIG. 4, only a portion or region 72a of the first area 72 may be attached to the panel 50, and only a portion or region 80a of the second area 80 may be attached to panel 65. Thus, each of regions 72a, 80a may be considered an attached portion or attached area that is attached to a respective panel, while the remaining portion of each area 72, 80, which is not attached to a respective panel, may be considered a non-attached portion or non-attached area. The attached and non-attached portions are configured or arranged such that during deformation of the container 90 due to a vehicle collision, the non-attached areas or portions contact the respective panels upon deformation from the collision. By having only a portion of the pressure containers (e.g., attached regions 72a, 80a of container 90) attached (e.g., adhered) to respective panels with a remaining non-attached area arranged to contact the panels only upon deformation, upon impact from a vehicle colliding with the exterior panel, the panels may be can maintain sufficient relative movement to one another and provide a reaction surface upon which the container 90 (e.g., the non-attached portion of the container 90) may press to deform the container 90. It should be appreciated that in various examples, the airtight deformable container may have only a single region having both an attached an non-attached area instead of two regions as illustrated.

In various examples, the areas 72a, 80a may comprise a shape or formation such as a protruding or concave shape as illustrated that extends generally in a lateral direction (i.e., from one lateral side to the other lateral side of vehicle 102 in FIG. 1 for example) so as to be able to provide a portion that is attached to a respective panel prior to deformation, while also having a portion that is not attached to a respective panel but contacts the panel during deformation. It should be appreciated that areas 72a, 80a may comprise any suitable shape for attaching the areas to the respective vehicle panels or any components or parts of the doors or to any other vehicle components as described herein. It should also be appreciated that any of the one or more of the multiple containers attached to a vehicle panel described herein may also be attached to respective panels in examples similar to the attachment illustrated and descried for container 90.

The airtight, deformable container 90 may comprise a pressure sensor 92c. The pressure sensor 92c may be any type of pressure sensor suitable for detecting a pressure increase within the airtight, deformable pressure containers herein (which pressure increase is a result of the containers deforming from a vehicle collision) and for generating a vehicle collision signal from the detected pressure increase. The pressure sensor 92c may be configured to communicate (e.g., communicate electrically) with the deployment control system (e.g., deployment control system 126 of occupant protection system 120) by sending a vehicle collision signal to the deployment control system. The sensor 92c, like sensors 32a-32f above, may be configured to communicate (e.g., communicate electrically) with a deployment control system (e.g., deployment control system 126 of occupant protection system 120) by sending a vehicle collision signal to the deployment control system. The pressure sensor 92c, like sensors 32a-32f, may be configured to generate such vehicle collision signal, for example, when an absolute pressure in the container increases by a predefined amount, e.g., the pressure increases by a predefined amount as measured in kPa. In other examples, the pressure sensor 92c may be configured to generate such vehicle collision signal when the pressure in the container increases to a point where it reaches a predetermined threshold level, e.g., a predetermined threshold level as measured in kPa. In other examples, the pressure sensor 92c may be configured to generate such vehicle collision signal when the pressure in the container increases at a predetermined rate of change, e.g., predetermined rate of change measured in kPa/per unit of time. In examples, the deployment control system may be configured to receive the vehicle collision signal from any one of multiple pressure sensors like sensor 92c to cause at least one inflator to provide gas to at least one airbag. While the deployment control system in various examples may be configured to receive a vehicle collision signal from any one of the multiple pressures sensors and each of the multiple sensors may generate such signals, it should be appreciated that the deployment control system may be configured in examples to provide gas from an inflator to at least one airbag upon receiving the first vehicle collision signal from one of the multiple possible vehicle collision signals generated. In other examples, the deployment control system may be configured to cause an inflator to provide gas to an airbag upon receiving more than one generated vehicle collision signal from the multiple pressure sensors.

In various examples, the airtight, deformable pressure container 90 may be pressurized above ambient pressure. By pressurizing the container 90 above ambient pressure, the container 90 may be configured to sense an increase in pressure from a vehicle collision sooner than a container at ambient pressure due to the pressurized container requiring less volume to be displaced in the container i.e., less deformation of the container) to sense an increase in pressure. In various examples, container 90 may comprise more than one pressure sensor, each sensor of which may be configured to generate a vehicle collision signal due to an increase in pressure in the container during a collision.

Figure 7:
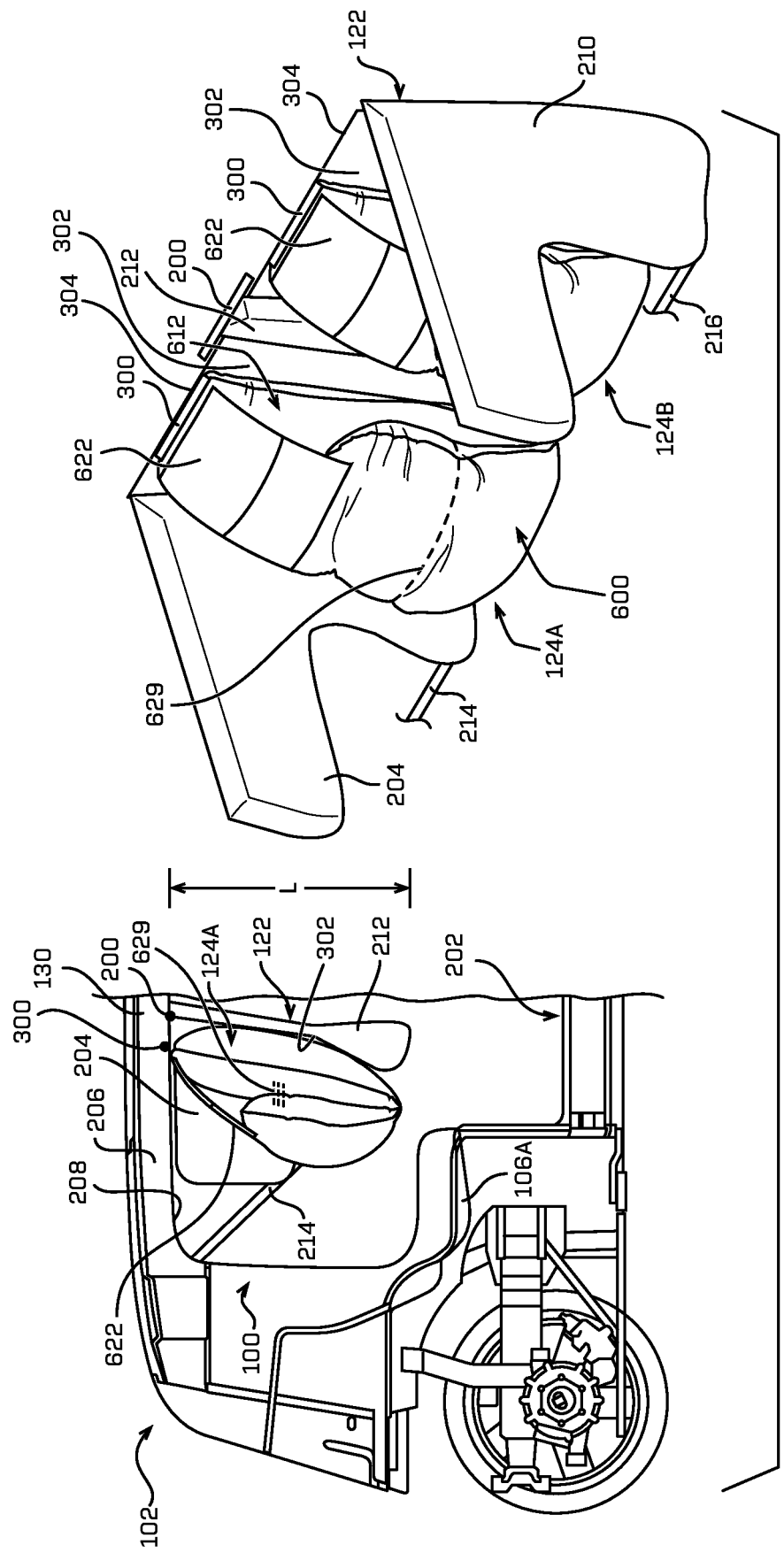
FIG. 7 is a partial side view of the example vehicle shown in FIG. 1 with an example airbag comprising an expandable curtain in a deployed state and example expandable bladders in a deployed state.

Turning now to FIGS. 6 and 7, these figures are side views of a portion of the example vehicle 102 shown in FIG. 1 with the occupants 104 omitted to aid clarity. FIG. 6 shows the example expandable curtain 122 in a deployed state (e.g., expanded or at least partially expanded) in the interior 100 of the vehicle 102. In the example shown, the expandable curtain 122 has been deployed from the vehicle roof 130 and is coupled to the vehicle roof 130 at an attachment point 200. In some examples, the expandable curtain 122 may be indirectly coupled to and supported by the vehicle roof 130, for example, via an intermediate coupling. The example expandable curtain 122 may be configured to be expanded from a stowed state, for example, as shown in FIG. 1, to a deployed state having a length L as shown in FIGS. 6 and 7. The expandable bladder 124 (e.g., a frontal airbag) may likewise be configured to be expanded from a stowed, for example, as shown in FIG. 1 state to a deployed as shown, for example, in FIGS. 6 and 7 and having a length L as shown in FIG. 7. As shown, in some examples, the expandable curtain 122 extends toward the vehicle floor 202 and terminates at a location spaced above the vehicle floor 202. In some examples, the expandable curtain 122 may extend to and terminate at the vehicle floor 202. In illustrated examples, the expandable curtain 122 in the deployed state may include a first side 204 configured to extend along a portion of a first interior or lateral side 206 of the vehicle 102. For example, the first side 204 of the expandable curtain 122 may extend in a direction substantially parallel to the first interior side 206 of the vehicle 102. In some examples, the first side 204 of the expandable curtain 122 may be deployed from a housing located above the opening 208 in the first interior side 206 and/or from the vehicle roof 130 of the vehicle 102. In some examples, the first side 204 of the expandable curtain 122 may be inflatable and may be configured to provide cushioning between the occupant 104 and the first interior side 206 of the vehicle 102.

In some examples, the expandable curtain 122 may also include a second side 210 opposite the first side 204 configured to extend along a portion of a second interior or lateral side (not shown in FIG. 6 due to limitations of the view provided) of the vehicle 102. The first and second interior sides of the vehicle 102 may be on opposite sides of the vehicle 102 and may extend substantially parallel to one another. It should therefore be appreciated that in examples, the second interior side may be located on an opposite lateral side of vehicle 102 from the first interior side 206. Thus, it should also appreciated that, in examples, a lateral or side-to-side movement or direction in the illustration of FIG. 1 may be considered a direction into and out of the paper, whereas a longitudinal direction may be considered a direction extending generally from the first end 112 of the vehicle 102 to the second end 118 of the vehicle 102, or from the second end 118 of the vehicle 102 to the first end 112 of the vehicle 102. In some examples, the second side 210 of the expandable curtain 122 may have structural, location, stowage, and/or deployment characteristics similar to, or the same as, the first side 204 of the expandable curtain 122, except that it may be located on the second interior side of the vehicle 102 and may be different to accommodate differences with being on the second interior side of the vehicle 102 instead of the first interior side 206.

The example expandable curtain 122 also includes a transverse portion 212 extending between the first side 204 and the second side 210 of the expandable curtain 122. In some examples, the first side 204, the second side 210, and the transverse portion 212 of the expandable curtain 122 form a contiguous barrier. For example, the first side 204, the second side 210, and the transverse portion 212 of the expandable curtain 122 may define or comprise a substantially horseshoe like shape or define or comprise a substantially U-shaped cross-sectional area as created by a plane normal to length extending downward from the roof 130 to the floor 202. In some examples, one or more of the first side 204, the second side 210, or the transverse portion 212 of the expandable curtain 122 may include one or more additional expandable portion (e.g., a channel) located adjacent the vehicle roof 130. The one or more additional expandable portions may assist the deployment of the first side 204, second side 210, and/or transverse portion 212 from the housing 132 upon initiation of the deployment of the expandable curtain 122. For example, the one or more additional expandable portions may assist with forcing open portions of an interior trim of the vehicle 102 configured to permit the expandable curtain to deploy from underneath the trim of the vehicle. Additional details of example trims operating with expandable curtains and bladders may be found, for example, in U.S. patent application Ser. No. 16/368,_____ (U.S. Pat. No. 10,960,844), the entire contents of which is incorporated herein for ail purposes.

In some examples, the occupant protection system 120 may include a first tether 214 coupled to the first side 204 and/or transverse portion 212 of the expandable curtain 122 and coupled to a portion of the vehicle 102, such as, for example, a portion associated with (e.g., directly or indirectly coupled to) the first interior side 206 (e.g., an interior panel or a structural member of the vehicle chassis 128) the floor 202, or the roof 130 of the vehicle 102, for example. For example, the first tether 214 may at one end be coupled to a free edge of the first side 204 of the expandable curtain 122, and at a second end coupled to an anchor associated with the first interior side 206 of the vehicle 102 and/or the vehicle roof 130. The occupant protection system 120 may also include a second tether 216 coupled to the second side 210 and/or transverse portion 212 of the expandable curtain 122 and configured to be coupled to a portion of the vehicle 102, such as, for example, a portion associated with (e.g., directly or indirectly coupled to) the second interior side, the floor 202, or the roof 130 of the vehicle 102, for example, in manner at least similar to the first tether 214. In some examples, the first and second tethers 214 and 216 may assist with preventing the expandable curtain 122, once deployed, from swinging in a direction away from the occupant 104 during the collision, for example, as the occupant 104 contacts the expandable curtain 122, either directly or indirectly, as explained herein. The tether(s) 214, 216 and any of the other tethers described herein may be made of any material(s) with suitable characteristics for the vehicles and occupant protection systems herein, e.g., woven nylon fabric and/or other similar materials.

Referring now more specifically to FIG. 7, FIG. 7 shows an example occupant protection system with example expandable curtain 122, a first example expandable bladder 124A and a second example expandable bladder 124B, each in a deployed (e.g., expanded or at least partially expanded) state. The deployed state shown in FIG. 7 is shown as an example of a first phase or first deployed state. It should be appreciated that in various examples, the occupant protection systems herein may not include an expandable curtain 122. The example expandable curtain 122 and/or the example expandable bladders 124A, 124B may be configured to be expanded from a stowed state, for example, as shown in FIG. 1, to the first phase or first deployed state, for example, as shown in FIG. 6 or FIG. 57In some examples, the expandable curtain 122 may be indirectly coupled to and supported by the vehicle roof 130, for example, via an intermediate coupling.

In the examples shown in FIG. 7, each of the expandable bladders 124A, 124B has been deployed from the vehicle roof 130 and coupled to the vehicle roof 130 at attachment points 300. For example, the expandable bladders 124A, 124B shown in FIG. 7 have expanded from a stowed state to a first deployed state or phase, and are associated with (e.g., directly or indirectly coupled to) the transverse portion 212 of the expandable curtain 122, for example, such that the expandable curtain 122 may support the expandable bladders 124A, 124B when an occupant 104 contacts one of the expandable bladders 124A or 124B as the occupant 104 is urged forward in the direction toward which the seat 106 is facing and into the expandable bladders 124A,124B (i.e., from left-to-right). For example, the transverse portion 212 of the expandable curtain 122 includes a front side or support side face 302 facing the seat 106 and the expandable bladders 124A and 124B, and as the occupant 104 contacts one of the expandable bladders 124A or 124B, the expandable bladder 124A or 124B presses against the support side face 302 of the expandable curtain 122. The transverse portion 212 of the expandable curtain 122 further includes a rear side or rear side face 304, which is opposite or faces an opposite direction as the support side face 302 and may be understood as being located or positioned on the back or rear side of the transverse portion 212 or the back or rear side of the expandable curtain 122 itself.

The expandable curtain 122 is suspended from the vehicle roof 130 (or adjacent thereto) at the attachment point 200 and is supported by the first and/or second tethers 214 and 216, which prevent the expandable curtain 122 from swinging freely about the attachment point 200 forward in the direction in which the seat 106 is facing and the direction in which the occupant 104 is moving. In this example manner, the occupant protection system 120 may protect the occupant 104 during a collision involving the vehicle 102, by preventing the occupant 104 from colliding in an un-cushioned or unprotected manner with interior structures of the vehicle 102 and/or, in some instances, preventing the occupant 104 from being ejected from the vehicle 102.

In the example shown in FIGS. 6 and 7, at least a portion of the first side 204 of the expandable curtain 122 and at least a portion of the second side 210 of the expandable curtain 122 extend away from the support face side 302 of the of the transverse portion 212 of the expandable curtain 122. In some examples, one or more of the expandable bladders 124A or 124B may be associated with (e.g., directly or indirectly coupled to) the support face side 302 of the transverse portion 212 and may be located between the first side 204 and the second side 210 of the expandable curtain 122, for example.

The first expandable bladder 124A and/or the second expandable bladder 124B may each be configured to expand from a stowed state to a deployed state associated with the transverse portion 212 of the expandable curtain 122, for example, as shown in FIG. 7. In some examples, the first expandable bladder 124A and/or the second expandable bladder 124B may be coupled to the transverse portion 212 of the expandable curtain 122. In some examples, the first expandable bladder 124A and/or the second expandable bladder 124B may not be coupled to the transverse portion 212 of the expandable curtain 122. For example, the first and/or second expandable bladder may be coupled, directly or indirectly, to the vehicle roof 130 independently of one another and/or independently of the expandable curtain 122.

In some examples, the first side 204, the second side 210, and/or the transverse portion 212 of the expandable curtain 122 may be configured such that when the expandable curtain 122 is deployed, a lower edge of the transverse portion 212 is closer to the seat 106 toward which the first side 204 and second side 210 extend than the upper portion of the transverse portion 212, thereby resulting in the transverse portion 212 extending downward toward the floor of the vehicle 102 and creating an angle relative to vertical, for example, as shown in FIG. 7. This angle may be created by a contraction of the first side 204 and/or the second side 210 as the expandable curtain 122 is deployed. This example configuration results the lower edge of the expandable curtain 122 being closer to the lower portion of the chest an occupant in the seat 106 than an upper portion of the chest and/or head of the occupant upon deployment. This creates a surface against which the first and/or second expandable bladders 124A and 124B may react and which results in arresting the lower portion of the chest of the occupant and allowing the upper chest and/or head of the occupant to continue forward and pivot downward into/against one of the expandable bladders 124 as the occupant is arrested by the expandable bladder 124.

In some examples, the deployment control system 126 (FIG. 1) may be configured to cause one or more of the first expandable bladder or airbag 124A, the second expandable bladder or airbag 124B, or the expandable curtain or airbag 122 to expand from a stowed state to a deployed state (e.g., an expanded or at least partially expanded state), for example, by activating one or more inflators 134 (FIG. 1) associated with (e.g., in flow or fluid communication with) one or more of the first expandable bladder 124A, the second expandable bladder 124B, or the expandable curtain 122. The first expandable bladder 124A, the second expandable bladder 124B, and the expandable curtain 122 may be deployed together, concurrently or substantially simultaneously, or may be deployed independently of one another. For example, the deployment control system 126 may be configured to cause the expandable curtain 122 to deploy and/or expand from the stowed state to the deployed state at a first time, and thereafter cause the first expandable bladder 124A and/or the second expandable bladder 124B to expand from the stowed state to the deployed state at a second time following the first time. In some examples, the first expandable bladder 124A or the second expandable bladder 124B may be deployed individually, for example, without necessarily deploying the other of the expandable bladders. By deploying the expandable curtain 122 and/or the expandable bladders 124A or 124B independently, the packaging of the occupant protection system 120 may be improved by, for example, reducing the size of gas generators associated with (e.g., that may form part of) the inflator(s) 134 and/or the housing(s) 132 used to contain the undeployed first and second expandable bladders 124A and 124B and expandable curtain 122. Additionally, or alternatively, by deploying the expandable curtain 122 and/or the expandable bladders 124A or 124B independently, replacement costs may be minimized, as only those deployed members would need replacing or refurbishing. Additional details of example deployment sequences for expandable bladders and expandable curtains may be found, for example, in U.S. patent application Ser. No. 16/368,603 (U.S. Pat. No. 10,960,844), the entire contents of which is incorporated herein for all purposes.

The example vehicle 102 shown in FIGS. 1, 6 and 7 may include the first seat 106A (FIG. 1) coupled to a portion the vehicle 102 and facing the first direction 114 relative to a longitudinal axis of the vehicle 102, and the vehicle 102 may also include the second seat 106B (FIG. 1) coupled to a portion the vehicle 102 and facing a second direction 116 opposite the first direction 114. In some examples of the occupant protection system 120, the first side 204 of the expandable curtain 122 and the second side 210 of the expandable curtain 122 may extend from the transverse portion 212 of the expandable curtain or airbag 122 in the second direction 116 toward the first seat 106A. The first expandable bladder 124A may be configured to deploy between the transverse portion 212 of the expandable curtain 122 and the first seat 106A.

Examples of the vehicles and occupant protection systems herein may include at least one expandable curtain at least partially stowed in a portion of the vehicle 102 and configured to be expanded from a stowed state to a deployed state extending between the vehicle roof 130 and the vehicle floor 202. Further details of various example first and second expandable curtains and bladders are discussed in U.S. application Ser. No. 15/963,641 (U.S. Pat. No. 10,471,923), which is incorporated herein by reference in its entirety for all purposes. In some examples, protection may be provided for occupants of seats facing both directions. For example, the seats 106A and 106B may face one another, for example, as shown in FIG. 1, and the first and second expandable curtains 122A and 122B may be configured to deploy between the two seats 106A and 106B. In some examples, the deployment control system 126 may be configured to receive signals from the pressure sensors of the airtight, deformable pressure containers herein and/or one or more signals indicative of a direction of travel of the vehicle 102, and cause deployment of the first expandable curtain and/or the second expandable curtain. For example, the first expandable curtain, the first expandable bladder 124A, the second expandable curtain 122B, and/or the second expandable bladder 124B may be deployed based at least in part on the one or more signals indicative of the direction of travel of the vehicle 102 or upon the vehicle collision signals from the one or more pressure sensors of the airtight, deformable pressure containers herein.

Figure 8:
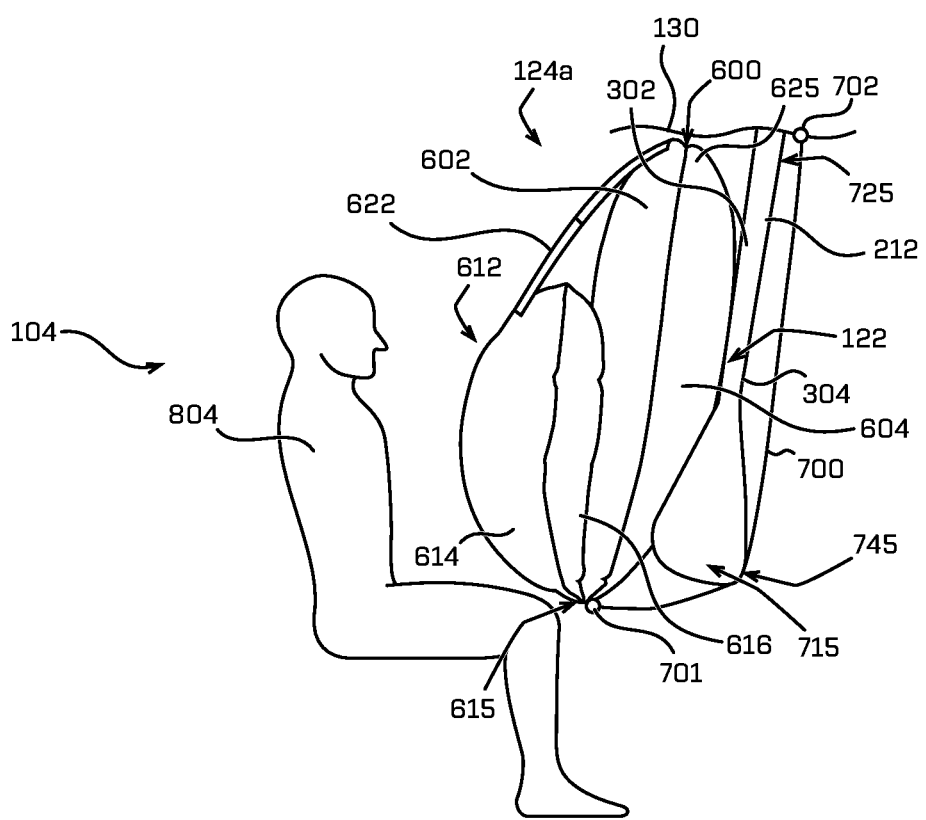
FIG. 8 is a schematic diagram showing an example expandable bladder and example expandable curtain with a vehicle occupant before the occupant contacts the expandable bladder and an example frictionally engaging tether.

Referring now more specifically to FIG. 8, FIG. 8 is a schematic diagram showing an example expandable bladder 124A, an example expandable curtain 122 and an example tether 700 for a vehicle including an occupant protection system 120 in a deployed state in which the tether 700 is attached at a first location 701 to the bladder 124 and attached at a second location 702 to the vehicle roof 130. The example expandable bladder 124A may comprise a first or initial expandable chamber 600 and a second or occupant restraining expandable chamber 612. The initial expandable chamber 600 may comprise an occupant facing portion 602 that is configured to generally face in the direction of an occupant or passenger of a vehicle (e.g., occupant 104 in FIG. 1 or occupant 804) in, for example, a deployed state of expandable bladder 124A. The initial expandable chamber 600 may further comprise a rear portion 604 that is configured to generally face a direction opposite to the occupant facing portion 602 in a deployed state of the expandable bladder 124A. The occupant facing portion 602 may comprise or define an opening having a perimeter (the opening and perimeter are not illustrated but described above and in greater detail in U.S. application Ser. No. 17/555,206, the entire contents of which is incorporated herein for all purposes). It should thus be appreciated that any of the airbag herein may comprise as illustrated and described with respect to FIG. 6.

The occupant restraining expandable chamber 612 may comprise an occupant contacting portion 614 having a surface that is generally configured to contact or face an occupant or passenger of a vehicle (e.g., passenger 104 in FIG. 1 or passenger 804 in FIG. 6) in, for example, a deployed state of expandable bladder 124A. The occupant restraining expandable chamber 612 may further comprise a rear portion 616 that is generally opposite the occupant contacting portion 614 in, for example, a deployed state of the expandable bladder 124A. The rear portion 616 of the occupant restraining expandable chamber 612 may comprise or define an opening having a perimeter. In examples, the opening of the rear portion 616 of occupant restraining expandable chamber 612 may be similarly or identically shaped to the opening of occupant facing portion of initial expandable chamber 600. The opening and perimeter of rear portion 616 are not illustrated but are described in detail in U.S. application Ser. No. 17/555,206, again, the entire contents of which is incorporated herein for all purposes. In examples, the occupant facing portion 602 of initial expandable chamber 600 may be attached to the rear portion 616 of occupant restraining expandable chamber 612 at or around at least a portion of the respective perimeters of the openings. In examples, the connection or attachment of occupant facing portion 602 to the rear portion 616 at or around at least a portion of perimeters may be via any suitable stitching technique or any other suitable attachment technique(s).

In examples, the example expandable bladder 124A may comprise the releasable connection 622 mentioned herein (e.g., a tearable flap 622), which may be configured to release a connection of the occupant restraining expandable chamber 612 to the initial expandable chamber 602 or to the vehicle (e.g., via a connection, either directly or indirectly, to the vehicle roof 130 or an area associated with the vehicle roof 130). In various examples, an end portion of the releasable connection 622 may be connected to a portion of initial expandable chamber 600, while an opposite end portion of the releasable connection 622 may be connected to another portion of occupant restraining expandable chamber 612. Again, further details of the releasable connection 622 may be found in U.S. application Ser. No. 17/555,206, the entire contents of which is incorporated herein for all purposes. It should be appreciated that in various examples of vehicles and vehicle occupant protections systems of the present disclosure, the expandable bladder(s) may not include a releasable connection and/or the openings mentioned above, and the expandable bladder(s) and curtain(s) may be any suitable bladder(s) and/or expandable curtain(s). Details of additional example expandable curtains and/or bladders that may utilized with any of the vehicles and occupant protection systems having a frictionally engaging tether herein may be found, for example, in U.S. application Ser. No. 15/963,641 (U.S. Pat. No. 10,471,923), which is incorporated herein by reference in its entirety for all purposes.

In examples, the expandable bladder 124A may comprise a first panel and a second panel and the second panel may be connected to or attached to the second panel. The first panel may be similarly shaped and sized to the second panel. In some examples, the first panel may be formed of, or comprise, a first generally rectangular flat piece of material, while the second panel may be formed of, or comprise, a second generally rectangular flat piece of material that is similarly shaped and sized to the rectangular flat piece of material of the first panel. The material of the first panel and second panel may in various examples comprise the same material, e.g., woven nylon fabric and/or other similar materials, or materials having suitable characteristics for the vehicles and occupant protection systems described herein. The first panel may comprise an initial expandable section and an occupant restraining section as discussed above. The second panel may similarly comprise an initial expandable section and an occupant restraining section. In examples, the initial expandable chamber may comprise, or be defined by, both the initial expandable section of the first panel and the initial expandable section of the second panel, while the occupant restraining expandable chamber may comprise, or be defined by, both the occupant restraining section of the first panel and the occupant restraining section of the second panel. Further details of such first and second panels and the initial expandable chamber comprising, or being defined by, both an initial expandable section of the first panel and an initial expandable section of the second panel, as well as the occupant restraining expandable chamber comprising or being defined by both the occupant restraining section of the first panel and the occupant restraining section of the second panel may be found in U.S. application Ser. No. 17/555,206, which is incorporated herein by reference in its entirety for all purposes.

Referring now to the tether 700 and the attachment of the tether 700 in the example of FIG. 4A, as shown, the first location 701 at which tether 700 may be attached to the expandable bladder 124A may be a bottom or distal portion 615 of expandable bladder 124A, which is opposite a top or proximal portion 625 of expandable bladder 124A. In examples, the first location 701 of distal portion 615 may be at a bottom most point or location of expandable bladder 124A, which may be located at an area far or generally furthest away from the vehicle roof 130 or closest to the vehicle floor 202 when the expandable bladder 124A is in a deployed state. As shown, the expandable curtain 122 may similarly comprise a bottom or distal portion 715, which is opposite a top or proximal portion 725 of expandable curtain 122. As further shown, the transverse portion 212 of expandable curtain 122 in the deployed state may comprise the front side or support side face 302, which faces expandable bladder 124A, and the rear side or rear side face 304, which is opposite or faces an opposite direction as the support side face 302 and may be understood as being located or positioned on the back side, rear side or behind the transverse portion 212 and/or the expandable curtain 122 itself. Thus, it should be appreciated that the tether 700 may be configured or arranged to extend from the first attachment location 701 at the expandable bladder 124A behind the expandable curtain 122 to the second attachment location 702 at the vehicle roof 130. Such an arrangement or configuration allows, during deployment (or the deployed state) of the occupant protection system 120, the rear side face 304 of the expandable bladder 124A to frictionally engage with the tether 700 to create a frictional coupling or engagement 745 between the expandable bladder 124A and the expandable curtain 122. The frictional engagement or coupling 745 limits or prevents movement of the expandable bladder 124A during deployment (or in the deployed state) by, for example, limiting or preventing lateral or side-to-side direction, such as from one lateral or interior side of the vehicle to another lateral or interior side of the vehicle (e.g., into and out of the paper in FIG. 4A for example), thus maximizing protection of the occupant during a collision of the vehicle. In various examples, the first location 701 and second location 702 may be any suitable location on the expandable bladder 124A and the vehicle roof 130, respectively, that may create such a frictional coupling or engagement. In examples, the frictional engagement or coupling 745 illustrated in FIG. 4A (and illustrated in any of the other examples described herein) may be a be frictional engagement or coupling that extends along any portion of the rear side face 304 of the expandable curtain 212. In other words, the frictional engagement or coupling in any of the vehicles or vehicle occupant protection systems herein may be a friction that occurs at any point of the tether(s) that extends behind the curtain and any portion of the rear side faces of any of the expandable curtains herein. The manner in which any of the tethers 700 herein are attached at any of the first or second locations 701, 702 herein may be any type of attachment suitable for holding or securing the tether(s) 700 during deployment and possible collision in a vehicle.

Figure 9:
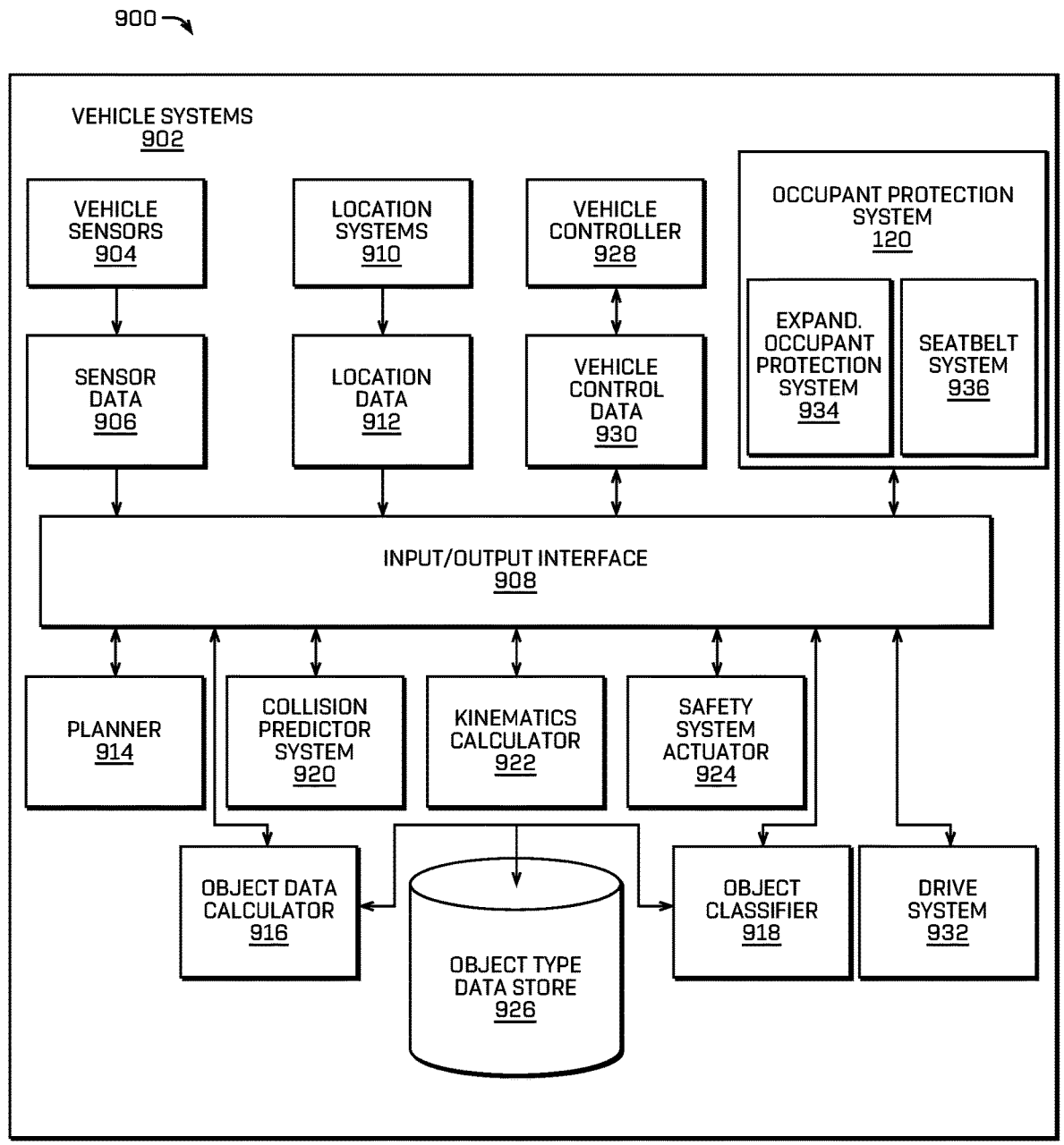
FIG. 9 is a block diagram showing an example architecture for vehicle systems including an example occupant protection system.

FIG. 9 is a block diagram of an example architecture 900 including vehicle systems 902 for controlling operation of the systems that provide data associated with operation of the vehicle 102, and that control operation of the vehicle 102. In various implementations, the architecture 900 may be implemented using a uniprocessor system including one processor, or a multiprocessor system including several processors (e.g., two, four, eight, or another suitable number). The processor(s) may be any suitable processor capable of executing instructions. For example, in various implementations, the processor(s) may be general-purpose or embedded processors implementing any of a variety of instruction set architectures (ISAs), such as the x86, PowerPC, SPARC, or MIPS ISAs, or any other suitable ISA. In multiprocessor systems, each processor may commonly, but not necessarily, implement the same ISA. In some examples, the processor(s) may include a central processing unit (CPU), a graphics processing unit (GPU), or a combination thereof.

The example architecture 900 may include a non-transitory computer readable media configured to store executable instructions/modules, data, and/or data items accessible by the processor(s). In various implementations, the non-transitory computer readable media may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described above, are shown stored within the non-transitory computer readable memory. In other implementations, program instructions, and/or data may be received, sent, or stored on different types of computer-accessible media, such as non-transitory media, or on similar media separate from the non-transitory computer readable media. Generally speaking, a non-transitory, computer readable memory may include storage media or memory media, such as flash memory (e.g., solid state memory), magnetic or optical media (e.g., a disk) coupled to the architecture 900 via an I/O interface. Program instructions and data stored via a non-transitory computer readable medium may be transmitted by transmission media or signals such as electrical, electromagnetic, or digital signals, which may be conveyed via a communication medium such as a network and/or a wireless link, such as may be implemented via a network interface.

In some implementations, the I/O interface may be configured to coordinate I/O traffic between the processor(s), the non-transitory computer readable media, and any peripheral devices, the network interface, or other peripheral interfaces, such as input/output devices. In some implementations, the I/O interface may perform any necessary protocol, timing, or other data transformations to convert data signals from one component (e.g., the non-transitory computer readable media) into a format suitable for use by another component (e.g., processor(s)). In some implementations, the I/O interface may include support for devices attached through various types of peripheral buses, such as a variant of the Peripheral Component Interconnect (PCI) bus standard or the Universal Serial Bus (USB) standard, for example. In some implementations, the function of the I/O interface may be split into two or more separate components, such as a north bridge and a south bridge, for example. Also, in some implementations, some or all of the functionality of the I/O interface, such as an interface to the non-transitory computer readable media, may be incorporated directly into the processor(s).

In the example architecture 900 shown in FIG. 9, the example vehicle systems 902 include a plurality of vehicle sensors 904, for example, configured to sense movement of the vehicle 102 through the environment, sense environmental data, such as the ambient temperature, pressure, and humidity, and/or sense objects in the environment surrounding the vehicle 102. In some examples, the vehicle sensors 904 may include sensors configured to identify a location on a map. The vehicle sensors 904 may include, for example, one or more light detection and ranging sensors (LIDAR), one or more cameras, one or more radio detection and ranging sensors (RADAR), one or more ultrasonic transducers, one or more microphones for sensing sounds in the environment, such as sirens from law enforcement and emergency vehicles, and other sensors related to the operation of the vehicle 102. Other sensors may include a speed sensor, sensors related to operation of internal combustion engines and/or electric motors, sensors related to the tires to detect tire temperature, tire pressure, and tread depth, and/or brake-related sensors for detecting brake temperatures and/or wear, and in vehicles having regenerative braking, sensors for detecting parameters related to operation of the regenerative braking system. The vehicle sensors 904 may also include, for example, inertial measurement units (IMUs), accelerometers, and gyroscopes. In examples, the vehicle sensors 904 may further include one or more pressure sensors including any of the pressure sensors of the airtight, deformable containers described herein with respect to any of the vehicles and vehicle occupant protection systems comprising same, such as pressures sensors 32a-32f or 92c described and illustrated above. The pressure sensors of the airtight, deformable containers described herein may be configured to generate the vehicle collision signal(s) due to an increase in pressure in the containers caused by a vehicle collision according to any of the examples described herein. The vehicle sensors 904 may be configured to provide sensor data 906 representative of the sensed objects and signals, including providing the vehicle collision signal(s) described herein, to the vehicle systems 902 via, for example, an input/output (I/O) interface 908. Other types of sensors and sensor data are contemplated.

The example vehicle systems 902 also include location systems 910 configured to receive location information, including position and orientation data (e.g., a local position or local pose) from the vehicle sensors 904 and/or external sources, and provide location data 912 to other portions of the vehicle systems 902 via the I/O interface 908. The external sources may include global satellites for facilitating operation of a global positioning system (GPS) and/or a wireless network for communicating and receiving information related to the vehicle's location, such as map data. The location systems 910 may also include sensors configured to assist with navigation of the vehicle 102, such as wheel encoders for sensing the rotation of the wheels, inertial navigation sensors, such as gyroscopes and/or accelerometers, and/or cameras, LIDAR, RADAR, etc. for obtaining image data for dead-reckoning navigation and/or SLAM-based approaches to localization.

The example vehicle systems 902 may also include one or more of a planner 914, an object data calculator 916, an object classifier 918, a collision predictor system 920, a kinematics calculator 922, and a safety system actuator 924. The vehicle systems 902 may be configured to access one or more data stores including, but not limited to, an object type data store 926. The object type data store 926 may include data representing object types associated with object classifications for objects detected in the environment.

The example vehicle systems 902 shown in FIG. 9 also include a vehicle controller 928 configured to receive vehicle control data 930, and based on the vehicle control data 930, communicate with a drive system 932 (e.g., a steering system, a propulsion system, suspension system, and/or a braking system) to control operation of the vehicle 102. For example, the vehicle control data 930 may be derived from data received from one or more of the vehicle sensors 904 and one or more of the planner 914, the object data calculator 916, the object classifier 918, the collision predictor system 920, the kinematics calculator 922, and the safety system actuator 924, and control operation of the drive system 932, so that operation and maneuvering of the vehicle 102 is executed.

In some examples, the planner 914 may be configured to generate data representative of a trajectory of the vehicle 102, for example, using data representing a location of the vehicle 102 in the environment and other data, such as local pose data, that may be included in the location data 912. In some examples, the planner 914 may also be configured to determine projected trajectories predicted to be executed by the vehicle 102. The planner 914 may, in some examples, be configured to calculate data associated with a predicted motion of an object in the environment, and may determine a predicted object path associated with the predicted motion of the object. In some examples, the object path may include the predicted object path. In some examples, the object path may include a predicted object trajectory. In some examples, the planner 914 may be configured to predict more than a single predicted object trajectory. For example, the planner 914 may be configured to predict multiple object trajectories based on, for example, probabilistic determinations or multi-modal distributions of predicted positions, trajectories, and/or velocities associated with an object.

In some examples, the object data calculator 916 may be configured to provide data representative of, for example, one or more of the location of an object in the environment surrounding the vehicle 102, an object track associated with the object, and an object classification associated with the object. For example, the object data calculator 916 may be configured to receive data in the form of sensor signals received from one or more of the vehicle sensors 904 and determine data representing one or more of the location in the environment of the object, the object track, and the object classification.

In some examples, the object classifier 918 may be configured to access data from the object type data store 926, which may be configured to store data representing object types, such as, for example, a species of an object classification, a subclass of an object classification, and/or a subset of an object classification. The object classifier 918, in some examples, may be configured to analyze data representing an object track and data representing an object classification with data representing an object type, and determine an object type based at least in part on the object track and classification data. For example, a detected object having an object classification of an "automobile" may have an object type of "sedan," "coupe," "hatch-back," "sports utility vehicle," "pick-up truck," or "minivan." An object type may include additional subclasses or subsets. For example, a "sedan" that is parked may have an additional subclass designation of being "static" or being "dynamic" if moving.

In some examples, the collision predictor system 920 may be configured to use the data representing the object type, the data representing the trajectory of the object, and/or the data representing the trajectory of the vehicle 102, to predict a collision between the vehicle 102 and the object.

In some examples, the kinematics calculator 922 may be configured to determine data representing one or more scalar and/or vector quantities associated with motion of objects in the environment, including, but not limited to, velocity, speed, acceleration, deceleration, momentum, local pose, and/or force. Data from the kinematics calculator 922 may be used to compute other data, including, but not limited to, data representing an estimated time to impact between an object and the vehicle 102, and data representing a distance between the object and the vehicle 102. In some examples, the kinematics calculator 922 may be configured to predict a likelihood that other objects in the environment (e.g., cars, motorcyclists, pedestrians, cyclists, and animals) are moving in an alert or controlled state, versus an un-alert or uncontrolled state. For example, the kinematics calculator 922 may be configured estimate the probability that other objects are moving as though they are being controlled and/or are behaving in a predictable manner, or whether they are not being controlled and/or behaving in an unpredictable manner, for example, by observing motion of the object over time and relative to other objects in the environment. For example, if the objects are moving erratically or without appearing to adjust to the presence or motion of other objects in the environment, this may be an indication that the objects are either uncontrolled or moving in an unpredictable manner. This may be inferred based on sensor data received over time that may be used to estimate or predict a future location of the object relative to a current or future trajectory of the vehicle 102.

In some examples, the safety system actuator 924 may be configured to activate one or more safety systems of the autonomous vehicle 102 when a collision is predicted by the collision predictor 920 and/or the occurrence of other safety related events, such as, for example, an emergency maneuver by the vehicle 102, such as hard braking or a sharp acceleration. The safety system actuator 924 may be configured to activate an interior safety system (e.g., including by sending signals, such as signal(s) from any one of the pressure sensors of the airtight, deformable containers described herein, to the deployment control system 126 of the occupant protection system 120), an exterior safety system (e.g., including warning sounds and/or warning lights), the drive system 932, which may be configured to execute an emergency maneuver to avoid a collision, and/or any combination thereof. For example, the drive system 932 may receive data for causing a steering system of the vehicle 102 to change the travel direction of the vehicle 102, and a propulsion system of the vehicle 102 to change the speed of the vehicle 102 to alter the trajectory of vehicle 102 from an initial trajectory to a trajectory for avoiding a collision.

Some examples of the vehicle systems 902 may operate according to the following example. Data representing a trajectory of the vehicle 102 in the environment may be received by the vehicle controller 928. Object data associated with an object in the environment may be calculated. Sensor data 906 from one or more of the vehicle sensors 904 may be used to calculate the object data. The object data may include data representing the location of the object in the environment, an object track associated with the object, such as whether the object is stationary or moving, and an object classification associated with the object, such as whether the object is another vehicle, a pedestrian, a cyclist, an animal, or a stationary object. In some examples, the object data calculator 916, based on the object data, may be used to determine data representing the object's location in the environment, data representing whether the object is moving, and data representing a classification associated with the object.

In some examples, the planner 914 may use the object data to determine a predicted path of the object in the environment, for example, based on data representing the location of the object and may process that data to generate data representing a predicted object path. Data representing the type of object may be determined based on the data representing whether the object is moving, data representing the object's classification, and/or data representing object's type. A pedestrian not in motion, a vehicle in motion, and traffic sign, a lane marker, or a fire hydrant, none of which is in motion, are examples of object types with an associated motion data.

In some examples, the collision predictor system 920 may be used to predict a collision between the vehicle 102 and an object in the environment based on the object type, whether the object is moving, the trajectory of the vehicle 102, the predicted path of the object obtained from the planner 914. For example, a collision may be predicted based in part on the object type due to the object moving, the trajectory of the object being in potential conflict with the trajectory of the vehicle 102, and the object having an object classification that indicates the object is a likely collision threat.

In some examples, the safety system actuator 924 may be configured to actuate one or more portions of a safety system of the vehicle 102 when a collision is predicted. For example, the safety system actuator 924 may activate one or more safety systems of the vehicle 102, such as, for example, one or more of the interior safety systems, one or more of the exterior safety systems, and one or more of the components of the drive system 932 (e.g., the steering system, the propulsion system, and/or the braking system) via the vehicle controller 928. In some examples, the vehicle controller 928 may determine that the interior safety system will be activated based on some action of an object in the environment, and the vehicle control data 930 may include information configured to cause the vehicle controller 928 to activate one or more functions of the interior safety system, the exterior safety system, and the drive system 932.

As shown in FIG. 9, the example vehicle systems 902 also include the occupant protection system 120, which may operate as described herein. In some examples, the occupant protection system 120 may include an air bag system or expandable occupant protection system 934 and a seatbelt system 936, which may be in communication with other vehicle systems 902 via the input/output interface 908. For example, the occupant protection system 120 may be in communication with the safety system actuator 924, and the deployment control system 126 may receive one or more signals from the vehicle systems 902, including one or more vehicle collision signals from the pressure sensors of the airtight, deformable containers described herein (e.g., one or more vehicle collision signal from one or more of pressure sensors 32a-32f, 90c, or any of the other pressure sensors herein), and activate the portions of the expandable occupant protection system 934, for example, as described herein.

Figure 10:
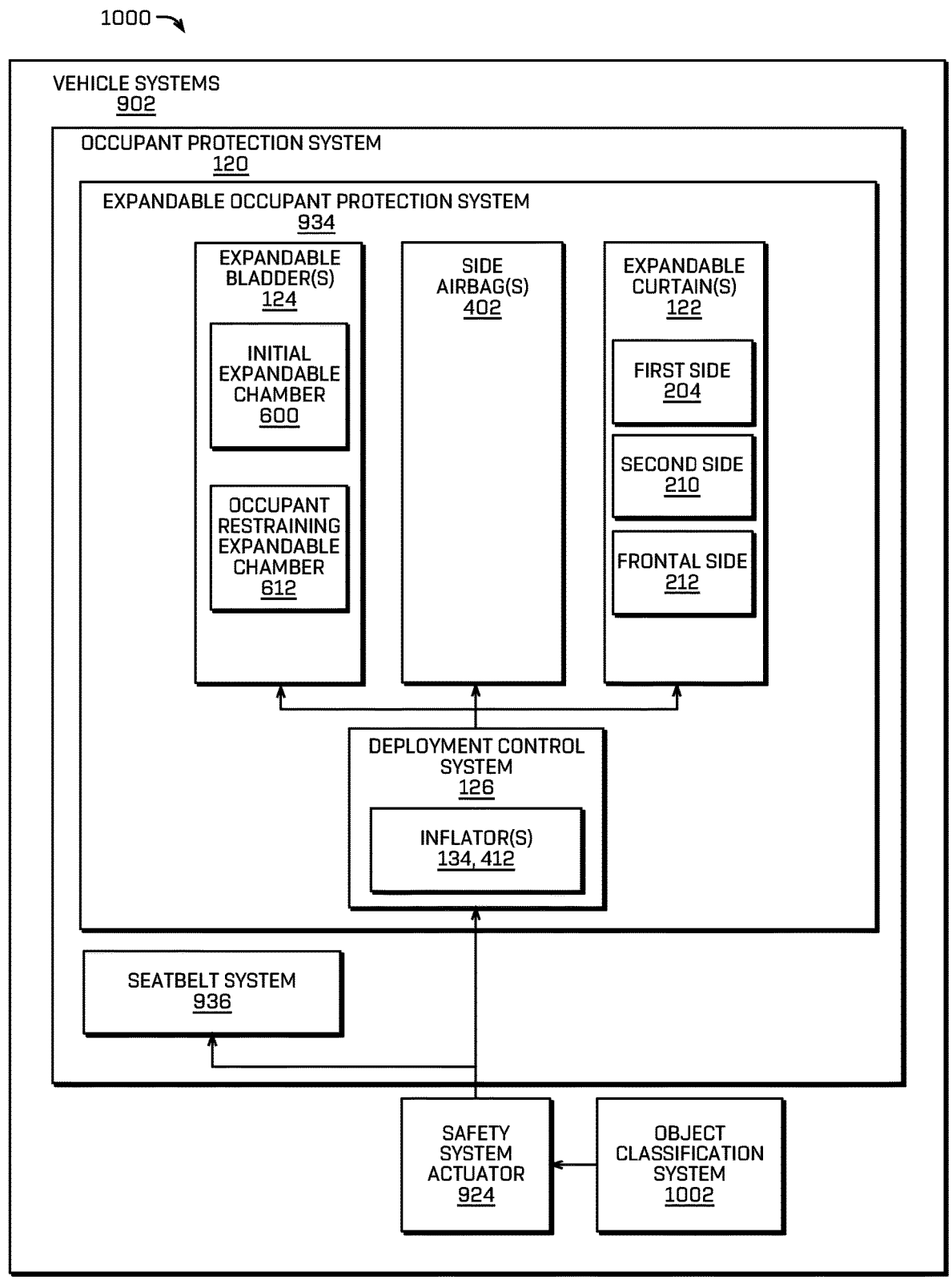
FIG. 10 is a block diagram including an example architecture for an occupant protection system.

FIG. 10 shows an example architecture 1000 including the vehicle systems 902 and the example occupant protection system 120. In the example shown, the example occupant protection system 120 includes an expandable occupant protection system 934 and a seatbelt system 936, which controls operation of systems related to the seatbelts in the vehicle 102. In the example shown, the expandable occupant protection system 934 includes multiple airbags such as one or more side airbag(s) 402, one or more expandable curtains 122, and one or more expandable bladders 124, for example, expandable bladder 124A, 124B, as described herein. The side airbag(s) 402 may comprise any of the components discussed herein including as illustrated with respect to FIGS. 2A and 2B above. The expandable curtain(s) 122 may comprise any of the components discussed herein and in examples may include one or more of a first side 204, a second side 210, and a transverse portion 212 extending between the first side 204 and second side 210 and, in some examples, coupling the first and second sides 204 and 210 to one another. The expandable bladder(s) 124 may include any of the components discussed herein and in examples may include one or more of a first initial expandable chamber 600 and a second occupant restraining expandable chamber 612.

In the example architecture 1000 shown in FIG. 10, the occupant protection system 120 includes the deployment control system 126, which may include one or more inflators, such as inflators 134, 412, which may be configured to supply fluid and/or gas to the airbag systems herein such as one or more of the side airbags 402, the expandable curtain(s) 122 and/or the expandable bladder(s) 124, for example, when activated by the deployment control system 126, as described herein. It should be appreciated that deployment control system 126 may activate inflators 134, 412 and thus inflators 134, 412 may be considered part of the deployment control system 126.

In some examples, the deployment control system 126 may be configured to receive one or more signals from one or more of the pressure sensors of the airtight, deformable containers described herein (e.g., one or more vehicle collision signal from one or more of sensors 32a-32f, 92c or any of the other airtight, deformable container pressure sensors according to any of the examples described herein), and cause deployment of any aspect or component of the vehicle occupant protection system 120. For example, the deployment control system 126 may be configured to receive one or more signals from one or more of the pressure sensors of the airtight, deformable containers described herein and cause deployment one or more of the side airbag(s) 402, expandable curtains 122, and/or one or more of the expandable bladders 124 based at least in part upon the signals from the pressure sensor(s). Alternatively or additionally, the deployment control system 126 may be configured to receive one or more signals from one or more of the pressure sensors of the airtight, deformable containers described herein, and cause deployment of one or more of the seatbelt systems based at least in part upon the signals from the pressure sensor(s).

In some examples, the deployment control system 126 may be configured to receive a signal indicative of a predicted collision involving the vehicle 102 and/or a collision involving the vehicle 102, and cause deployment of one or more expandable curtains 122, and/or one or more expandable bladders 124 based at least in part on the signal(s). For example, the vehicle sensors 904 may provide information to the collision predictor system 920, which may predict a collision with an object in the environment through which the vehicle 102 is travelling. The collision predictor system 920 may provide information to the safety actuator system 924, which in turn, provides one or more signals to the deployment control system 126, which may activate one more inflators 134, 412 to cause deployment of one or more side airbag 402, expandable curtains 122 and/or one or more expandable bladders 124.

In some examples, the deployment control system 126 may be configured to receive one or more signals indicative of the presence of an, such as occupant 104, 416, in a first location of the vehicle 102 associated with (e.g., within an effective range of) one of the expandable bladders 124, and cause deployment of the corresponding expandable bladder 124 associated with the position of the occupant 104, 416 based at least in part on the one or more signals. For example, the vehicle systems 902 may include an object classification system 1002 configured to determine information related, for example, to whether an object and/or occupant 104, 416 is present in one or more of the respective seats 106 or seat assemblies 406 of the vehicle 102. In some examples, the object classification system 1002 may leverage one or more of the vehicle sensors 904 and determine information about the object and/or occupant 104, 416, such as, for example, the size and/or weight of the object and/or occupant 104, 416 (e.g., whether the occupant 104, 416 is an adult, a child, or an infant). As a non-limiting example, image systems (e.g., cameras) internal to the vehicle 102 may determine presence of an occupant 104, 416 in a seat 106 or seat assembly 406. If no occupant 104, 416 is present, the deployment control system 126 may receive one or more signals associated with whether an occupant 104, 416 is in the seat 106 or seat assembly 406, for example, via the safety system actuator 924, and based at least in part on the one or more signals, determine whether to initiate deployment of, before or during a collision, the side airbag 402, the expandable curtain 122 and/or the expandable bladder 124 associated with (e.g., within an effective range of) the seat 106 or seat assembly 406. For example, if an occupant 104, 416 is not present in the seat 106 or seat assembly 406, the deployment control system 126 may not initiate deployment of the side airbag 402, the expandable curtain 122 or the expandable bladder 124. This may prevent unnecessary deployment and prevent costs associated with servicing deployed parts of the occupant protection system 120. Alternatively, if an occupant 104, 416 is present in the seat 106 or seat assembly 406, the deployment control system 126 may initiate deployment of the side airbag 402, the expandable curtain 122 and/or the expandable bladder 124 associated with (e.g., within an effective range of) the position of the occupant 104, 416 to protect the occupant 104, 416 during the collision.

In some examples, the deployment control system 126 may be configured to receive one or more signals indicative of whether the occupant, such as occupant 104, 416, is properly wearing a seatbelt, and cause and/or control deployment of the side airbag 402, expandable curtain 122 and/or the expandable bladder 124 associated with the position of the occupant 104 based at least in part on the one or more signals indicative of whether the occupant 104 is properly wearing the seatbelt. For example, the vehicle sensors 904 and/or vehicle systems 902 may determine whether the occupant 104, 416 is properly wearing a seatbelt. The deployment control system 126 may receive one or more such signals and, based at least in part on the signals, initiate and/or control deployment of the side airbag 402, the expandable curtain 122 and/or the expandable bladder 124 before or during a collision involving the vehicle 102.

For example, if the occupant 104, 416 is wearing a seatbelt, the deployment control system 126 may reduce the deployment rate and/or the deployment volume (or pressure) of the expandable curtain 122 and/or expandable bladder 124, for example, since the seatbelt will be expected to assist with preventing injury to the occupant 104, 416 during the collision. If, on the other hand, the occupant 104, 416 is not properly wearing a seatbelt, the deployment control system 126 may maintain or increase the deployment rate and/or the deployment volume (or pressure) of the side airbag 402, the expandable curtain 122 and/or expandable bladder 124, for example, since the seatbelt will not be expected to assist with preventing injury to the occupant 104, 416 during the collision.

In some examples, deployment of the side airbag, expandable curtain 122 and/or one or more of the expandable bladders 124 may be affected by a number of parameters. For example, the deployment rate, the deployment volume (or pressure), the timing of deployment, and/or the sequence of deployment of one or more of the side airbag 402, expandable curtain 122 or the expandable bladders 124 may be altered based at least in part on one or more parameters, such as, for example, the severity of a collision impact, whether one or more occupants 104, 416 is/are properly wearing a seatbelt, and/or the size and/or weight of the occupant(s) 104, 416 (e.g., depending on whether the occupant is an adult, a child, or an infant).

In some examples, the side airbag 404, expandable curtain 122 and one or more of the expandable bladders 124 may be deployed independently from one another. For example, the expandable curtain 122 may be deployed without deploying any of the expandable bladders 124. For example, if objects are detected in the interior 100 of the vehicle 102 and a rapid change in the speed and/or direction of travel of the vehicle 102 occurs, the expandable curtain 122 alone may be deployed to prevent objects in the vehicle 102 from being tossed around inside the vehicle 102 during the rapid change in speed and/or direction. This may be particularly useful when, for example, an occupant 104 is in a seat 106 facing a seat 106 on which one or more objects have been placed. Upon the rapid change of speed and/or direction, the expandable curtain 122 may be deployed in order to prevent the one or more objects from being thrown from the seat 106 opposite the occupant 104 into the occupant 104.

The deployment control system 126, in some examples, may be configured to receive one or more signals indicative of a direction of travel of the vehicle 102, and cause deployment of the expandable curtain 122 and/or the expandable bladder 124 based at least in part on the one or more signals indicative of the direction of travel of the vehicle 102. For example, the vehicle 102 may be a bi-directional vehicle configured to travel between locations with either end of the vehicle 102 being the leading end, for example, as described herein with respect to FIG. 1. In such vehicles, a seat 106 may be facing the direction of travel when the vehicle 102 is traveling with one end of the vehicle being the leading end, but with the seat 106 facing rearward with the other end of the vehicle 102 being the leading end. The vehicle 102 may include sensors and/or a system configured to generate one or more signals indicative of whether the vehicle 102 is traveling in a direction such that the seat 106 is facing forward (i.e., along a direction of travel) or the seat 106 is facing rearward (i.e., opposing a direction of travel). The deployment control system 126 may be configured to prevent deployment of the expandable curtain 122 and/or the expandable bladder 124 associated with the seat 106, even when occupied, for example, when the seat 106 is facing rearward based at least in part on the signals. This may prevent unnecessary deployment and costs associated with servicing deployed parts of the occupant protection system 120. Alternatively, if the seat 106 is facing forward, the deployment control system 126 may initiate deployment of the expandable curtain 122 and/or the expandable bladder 124 associated with the position of the seat 106 to protect the occupant 104 during the collision, for example, as described herein.

In various implementations, the parameter values and other data illustrated herein may be included in one or more data stores, and may be combined with other information not described or may be partitioned differently into more, fewer, or different data structures. In some implementations, data stores may be physically located in one memory or may be distributed among two or more memories.

Those skilled in the art will appreciate that the example architectures 900 and 1000 are merely illustrative and are not intended to limit the scope of the present disclosure. In particular, the computing system and devices may include any combination of hardware or software that can perform the indicated functions, including computers, network devices, internet appliances, tablet computers, PDAs, wireless phones, pagers, etc. The architectures 900 and 1000 may also be connected to other devices that are not illustrated, or instead may operate as a stand-alone system. In addition, the functionality provided by the illustrated components may in some implementations be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated architectures 900 and 1000. Some or all of the system components or data structures may also be stored (e.g., as instructions or structured data) on a non-transitory, computer-accessible medium or a portable article to be read by an appropriate drive, various examples of which are described above. In some implementations, instructions stored on a computer-accessible medium separate from the architectures 900 and 1000 may be transmitted to the architectures 900 and 1000 via transmission media or signals such as electrical, electromagnetic, or digital signals, conveyed via a communication medium such as a wireless link. Various implementations may further include receiving, sending, or storing instructions and/or data implemented in accordance with the foregoing description on a computer-accessible medium. Accordingly, the techniques described herein may be practiced with other control system configurations. Additional information about the operations of the modules of the vehicle 102 is discussed below.

It should be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules, program modules include routines, programs, components, data structures, and other types of structures that perform particular tasks or implement particular abstract data types.

Those skilled in the art will also appreciate that aspects of the subject matter described herein may be practiced on or in conjunction with other computer system configurations beyond those described herein, including multiprocessor systems, microprocessor-based or programmable consumer electronics, minicomputers, mainframe computers, hand-held computers, mobile telephone devices, tablet computing devices, special-purposed hardware devices, network appliances, and the like.

Based on the foregoing, it should be appreciated that technologies for deploying an occupant protection system have been presented herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and media are disclosed as example forms of implementing the subject matter recited in the claims.

EXAMPLE CLAUSES

A: A vehicle comprising: a carriage style seating arrangement; a vehicle occupant protection system comprising: an airtight, deformable container coupled to the vehicle, the airtight, deformable container comprising a pressure sensor configured to generate a vehicle collision signal resulting from the airtight, deformable container deforming during a vehicle collision and thereby causing an increase in pressure in the airtight, deformable container; a side airbag configured to expand between a stowed state and a deployed state, and an inflator configured to provide a gas to the side airbag, and a deployment control system configured to: (i) receive the vehicle collision signal from the pressure sensor, and (ii) based upon the vehicle collision signal, cause the inflator to provide the gas to the side airbag to thereby cause the side airbag to expand from the stowed state to the deployed state.

B: The vehicle as paragraph A describes, wherein the airtight, deformable container is a first airtight, deformable container and the pressure sensor is a first pressure sensor, and which comprises a second airtight, deformable container, the second airtight, deformable container comprising a second pressure sensor configured to generate a vehicle collision signal resulting from the second airtight, deformable container deforming and thereby causing an increase in pressure in the airtight, deformable container; wherein the deployment control system is configured to: (i) receive the vehicle collision signal from either the first pressure sensor or the second pressure sensor, and (ii) based upon the vehicle collision signal from either the first pressure sensor or the second pressure sensor, cause the inflator to provide the gas to the side airbag to thereby cause the side airbag to expand from the stowed state to the deployed state.

C: The vehicle as paragraphs A and B describe, wherein the vehicle comprises an exterior panel and an interior panel, and wherein the airtight, deformable container is positioned between the exterior panel and the interior panel.

D: The vehicle as paragraphs A-C describe, wherein the deployment control system is configured to (i) receive the vehicle collision signal, and (ii) based upon the vehicle collision signal, cause the gas inflator to provide gas to the side airbag within 8 milliseconds or less of the airtight, deformable container deforming to generate the vehicle collision signal.

E: The vehicle as paragraphs A-D describe, comprising an interior panel and an exterior panel, and wherein the airtight, deformable container comprises: a first area comprising: an attached portion coupled to the exterior panel, and a non-attached portion arranged to contact the exterior panel when the airtight deformable container deforms, and a second area comprising: an attached portion coupled to the interior panel, and a non-attached portion arranged to contact the exterior panel when the airtight deformable container deforms.

F: The vehicle as paragraphs A-E describe, wherein the deployment control system is configured to (i) receive the vehicle collision signal, and (ii) based upon the vehicle collision signal, cause the gas inflator to provide gas to the side airbag within 5 milliseconds or less of the airtight, deformable container deforming to generate the vehicle collision signal.

G: An airtight, deformable container configured for being coupled to at least one component of a vehicle or being defined by at least one component of the vehicle, the airtight, deformable container comprising: a pressure sensor configured to: (i) generate a vehicle collision signal resulting from the airtight, deformable container deforming during a vehicle collision and thereby causing an increase in pressure in the airtight, deformable container, and (ii) communicate with a deployment control system of a vehicle occupant protection system such that the deployment control system is configured to: (a) receive the vehicle collision signal from the pressure sensor, and (b) based upon the vehicle collision signal, activate the vehicle occupant protection system.

H: The airtight, deformable container as paragraph G describes, wherein the pressure sensor is configured to communicate with the deployment control system such that the deployment control system is configured to: (a) receive the vehicle collision signal from the pressure sensor, and (b) based upon the vehicle collision signal, cause an inflator of the vehicle occupant protection system to provide gas to an airbag of the vehicle occupant protection system.

I: The airtight, deformable container as paragraphs G and H describe, wherein the airtight, deformable container is a first airtight, deformable container, the first airtight, deformable container comprising a first pressure sensor, and comprising a second airtight, deformable container, the second airtight, deformable container comprising a second pressure sensor, each of the first and second pressure sensors configured to: (i) generate a vehicle collision signal resulting from a respective one of the first or second airtight, deformable container deforming during a vehicle collision and thereby causing an increase in pressure in the respective one of the first or second airtight, deformable container, and (ii) communicate with the deployment control system of the vehicle occupant protection system in which the deployment control system is configured to (a) receive the vehicle collision signal from the first pressure sensor or the second pressure sensor, and (b) based upon the vehicle collision signal from the first pressure sensor or the second pressure sensor, activate the vehicle occupant protection system.

J: The airtight, deformable container as paragraphs G-I describe, comprising (i) an elastically deformable material configured to deform during a vehicle collision without rupturing, or (ii) a plastically deformable material configured to deform during a vehicle collision without rupturing.

K: The airtight, deformable container as paragraphs G-J describe, comprising a pressure greater than ambient pressure.

L: The airtight, deformable container as paragraphs G-K describe, comprising a substantially cushion shape or cylindrical shape.

M: A vehicle occupant protection system comprising: an airtight, deformable container comprising a pressure sensor configured to generate a vehicle collision signal resulting from the airtight, deformable container deforming during a vehicle collision and thereby causing an increase in pressure in the airtight, deformable container; an airbag configured to expand between a stowed state and a deployed state; an inflator configured to provide a gas to the airbag, and a deployment control system configured to: (i) receive the vehicle collision signal from the pressure sensor, and (ii) based upon the vehicle collision signal, cause the inflator to provide the gas to the airbag to thereby cause the airbag to expand from the stowed state to the deployed state.

N: The vehicle occupant protection system as paragraph M describes, wherein the airtight, deformable container is cushion shaped or cylindrically shaped.

O: The vehicle occupant protection system as paragraphs M and N describe, wherein the airtight, deformable container is configured to be defined by a first vehicle door panel and a second vehicle door panel.

P: The vehicle occupant protection system as paragraphs M-O describe, wherein the deployment control system is configured to (i) receive the vehicle collision signal from the pressure sensor, and (ii) based upon the vehicle collision signal, cause the inflator to provide the gas to the airbag within 5 milliseconds or less of the airtight, deformable container deforming to generate the vehicle collision signal.

Q: The vehicle occupant protection system as paragraphs M-P describe, wherein the airtight, deformable container is pressurized so as to be at a pressure greater than ambient.

R: The vehicle occupant protection system as paragraphs M-Q describe, wherein the airtight, deformable container comprises an elastically deformable material or a plastically deformable material, each of the elastically deformable material or the plastically deformable material configured such that, during a vehicle collision, the material deforms without rupturing the airtight, deformable container.

S: The vehicle occupant protection system as paragraph M-R describe, wherein the airbag comprises a side airbag and the deployment controller system is configured to receive the vehicle collision signal from the pressure sensor and based upon the vehicle collision signal, cause the inflator to provide gas to the side airbag to thereby cause the side airbag to expand from the stowed state to the deployed state.

T: The vehicle occupant protection system as paragraph M-S describe, wherein the airtight, deformable container is configured to be positioned between and coupled to a first vehicle panel and a second vehicle panel.

While the example clauses described above are described with respect to one particular implementation, it should be understood that, in the context of this document, the content of the example clauses may be implemented via a method, device, system, computer-readable medium, and/or another implementation. Additionally, any of examples A-T may be implemented alone or in combination with any other one or more of the examples A-T.

What is claimed is:

1. A vehicle comprising:
    a carriage style seating arrangement; and
    a vehicle occupant protection system comprising:
        an airtight, deformable container coupled to the vehicle, the airtight, deformable container comprising a pressure sensor configured to generate a vehicle collision signal resulting from the airtight, deformable container deforming during a vehicle collision and thereby causing an increase in pressure in the airtight, deformable container;
        a side airbag configured to expand between a stowed state and a deployed state,
        an inflator configured to provide a gas to the side airbag, and
        a deployment control system configured to:
            (i) receive the vehicle collision signal from the pressure sensor, and
            (ii) based upon the vehicle collision signal, cause the inflator to provide the gas to the side airbag to thereby cause the side airbag to expand from the stowed state to the deployed state.

2. The vehicle of claim 1, wherein the airtight, deformable container is a first airtight, deformable container and the pressure sensor is a first pressure sensor, and which comprises a second airtight, deformable container, the second airtight, deformable container comprising a second pressure sensor configured to generate a vehicle collision signal resulting from the second airtight, deformable container deforming and thereby causing an increase in pressure in the airtight, deformable container;
    wherein the deployment control system is configured to:
        (i) receive the vehicle collision signal from either the first pressure sensor or the second pressure sensor, and
        (ii) based upon the vehicle collision signal from either the first pressure sensor or the second pressure sensor, cause the inflator to provide the gas to the side airbag to thereby cause the side airbag to expand from the stowed state to the deployed state.

3. The vehicle of claim 1, wherein the vehicle comprises an exterior panel and an interior panel, and wherein the airtight, deformable container is positioned between the exterior panel and the interior panel.

4. The vehicle of claim 1, wherein the deployment control system is configured to (i) receive the vehicle collision signal, and (ii) based upon the vehicle collision signal, cause the inflator to provide gas to the side airbag within 8 milliseconds or less of the airtight, deformable container deforming to generate the vehicle collision signal.

5. The vehicle of claim 1, comprising an interior panel and an exterior panel, and wherein the airtight, deformable container comprises:
    a first area comprising:
        an attached portion coupled to the exterior panel, and
        a non-attached portion arranged to contact the exterior panel when the airtight deformable container deforms, and
    a second area comprising:
        an attached portion coupled to the interior panel, and
        a non-attached portion arranged to contact the exterior panel when the airtight deformable container deforms.

6. The vehicle of claim 1, wherein the deployment control system is configured to (i) receive the vehicle collision signal, and (ii) based upon the vehicle collision signal, cause the inflator to provide gas to the side airbag within 5 milliseconds or less of the airtight, deformable container deforming to generate the vehicle collision signal.

7. An airtight, deformable container configured for being coupled to at least one component of a vehicle or being defined by at least one component of the vehicle, the airtight, deformable container comprising:
    a pressure sensor configured to:
        (i) generate a vehicle collision signal resulting from the airtight, deformable container deforming during a vehicle collision and thereby causing an increase in pressure in the airtight, deformable container, and
        (ii) communicate with a deployment control system of a vehicle occupant protection system such that the deployment control system is configured to: (a) receive the vehicle collision signal from the pressure sensor, and (b) based upon the vehicle collision signal, activate the vehicle occupant protection system.

8. The airtight, deformable container of claim 7, wherein the pressure sensor is configured to communicate with the deployment control system such that the deployment control system is configured to: (a) receive the vehicle collision signal from the pressure sensor, and (b) based upon the vehicle collision signal, cause an inflator of the vehicle occupant protection system to provide gas to an airbag of the vehicle occupant protection system.

9. The airtight, deformable container of claim 7,
    wherein the airtight, deformable container is a first airtight, deformable container, the first airtight, deformable container comprising a first pressure sensor, and
    comprising a second airtight, deformable container, the second airtight, deformable container comprising a second pressure sensor, each of the first and second pressure sensors configured to:
        (i) generate a vehicle collision signal resulting from a respective one of the first or second airtight, deformable container deforming during a vehicle collision and thereby causing an increase in pressure in the respective one of the first or second airtight, deformable container, and
        (ii) communicate with the deployment control system of the vehicle occupant protection system in which the deployment control system is configured to (a) receive the vehicle collision signal from the first pressure sensor or the second pressure sensor, and (b) based upon the vehicle collision signal from the first pressure sensor or the second pressure sensor, activate the vehicle occupant protection system.

10. The airtight, deformable container of claim 7, comprising (i) an elastically deformable material configured to deform during a vehicle collision without rupturing, or (ii) a plastically deformable material configured to deform during a vehicle collision without rupturing.

11. The airtight, deformable container of claim 7, comprising a pressure greater than ambient pressure.

12. The airtight, deformable container of claim 7, comprising a substantially cushion shape or cylindrical shape.

13. A vehicle occupant protection system comprising:
    an airtight, deformable container comprising a pressure sensor configured to generate a vehicle collision signal resulting from the airtight, deformable container deforming during a vehicle collision and thereby causing an increase in pressure in the airtight, deformable container;
    an airbag configured to expand between a stowed state and a deployed state;
    an inflator configured to provide a gas to the airbag, and
    a deployment control system configured to:
        (i) receive the vehicle collision signal from the pressure sensor, and
        (ii) based upon the vehicle collision signal, cause the inflator to provide the gas to the airbag to thereby cause the airbag to expand from the stowed state to the deployed state.

14. The vehicle occupant protection system of claim 13, wherein the airtight, deformable container is cushion shaped or cylindrically shaped.

15. The vehicle occupant protection system of claim 13, wherein the airtight, deformable container is configured to be defined by a first vehicle door panel and a second vehicle door panel.

16. The vehicle occupant protection system of claim 13, wherein the deployment control system is configured to (i) receive the vehicle collision signal from the pressure sensor, and (ii) based upon the vehicle collision signal, cause the inflator to provide the gas to the airbag within 5 milliseconds or less of the airtight, deformable container deforming to generate the vehicle collision signal.

17. The vehicle occupant protection system of claim 13, wherein the airtight, deformable container is pressurized so as to be at a pressure greater than ambient.

18. The vehicle occupant protection system of claim 13, wherein the airtight, deformable container comprises an elastically deformable material or a plastically deformable material, each of the elastically deformable material or the plastically deformable material configured such that, during a vehicle collision, the material deforms without rupturing the airtight, deformable container.

19. The vehicle occupant protection system of claim 13, wherein the airbag comprises a side airbag and the deployment control system is configured to receive the vehicle collision signal from the pressure sensor and based upon the vehicle collision signal, cause the inflator to provide gas to the side airbag to thereby cause the side airbag to expand from the stowed state to the deployed state.

20. The vehicle occupant protection system of claim 13, wherein the airtight, deformable container is configured to be positioned between and coupled to a first vehicle panel and a second vehicle panel.

* * * * *